US008671069B2

(12) United States Patent
Chang et al.

(10) Patent No.: US 8,671,069 B2
(45) Date of Patent: Mar. 11, 2014

(54) RAPID IMAGE ANNOTATION VIA BRAIN STATE DECODING AND VISUAL PATTERN MINING

(75) Inventors: Shih-Fu Chang, New York, NY (US); Jun Wang, New York, NY (US); Paul Sajda, New York, NY (US); Eric Pohlmeyer, Hallandale, FL (US); Barbara Hanna, New York, NY (US); David Jangraw, New York, NY (US)

(73) Assignee: The Trustees of Columbia University, in the city of New York, New York, NY (US)

( * ) Notice: Subject to any disclaimer, the term of this patent is extended or adjusted under 35 U.S.C. 154(b) by 175 days.

(21) Appl. No.: 13/205,044

(22) Filed: Aug. 8, 2011

(65) Prior Publication Data

US 2012/0089552 A1    Apr. 12, 2012

Related U.S. Application Data

(63) Continuation of application No. PCT/US2009/069237, filed on Dec. 22, 2009.

(60) Provisional application No. 61/233,325, filed on Aug. 12, 2009, provisional application No. 61/171,789, filed on Apr. 22, 2009, provisional application No. 61/151,124, filed on Feb. 9, 2009, provisional application No. 61/142,488, filed on Jan. 5, 2009, provisional application No. 61/140,035, filed on Dec. 22, 2008.

(51) Int. Cl.
*G06N 5/00*    (2006.01)

(52) U.S. Cl.
USPC ............................................ 706/52; 706/45

(58) Field of Classification Search
USPC ..................................................... 706/52, 45
See application file for complete search history.

(56) References Cited

U.S. PATENT DOCUMENTS

| 4,649,380 A | 3/1987 | Pena |
| 4,712,248 A | 12/1987 | Hongo |
| 5,144,685 A | 9/1992 | Nasar et al. |
| 5,191,645 A | 3/1993 | Carlucci et al. |
| 5,204,706 A | 4/1993 | Saito |
| 5,208,857 A | 5/1993 | Lebrat |

(Continued)

FOREIGN PATENT DOCUMENTS

| EP | 0579319 | 1/1994 |
| EP | 0587329 | 3/1994 |

(Continued)

OTHER PUBLICATIONS

Huang, et al., Active Learning for Interactive Multimedia Retrieval, Proceedings of the IEEE, vol. 96, No. 4, Apr. 2008, pp. 648-667.*

(Continued)

*Primary Examiner* — Wilbert L Starks
(74) *Attorney, Agent, or Firm* — Baker Botts, L.L.P.

(57) ABSTRACT

Human visual perception is able to recognize a wide range of targets but has limited throughput. Machine vision can process images at a high speed but suffers from inadequate recognition accuracy of general target classes. Systems and methods are provided that combine the strengths of both systems and improve upon existing multimedia processing systems and methods to provide enhanced multimedia labeling, categorization, searching, and navigation.

72 Claims, 9 Drawing Sheets

(56) References Cited

U.S. PATENT DOCUMENTS

| | | |
|---|---|---|
| 5,262,856 A | 11/1993 | Lippman et al. |
| 5,408,274 A | 4/1995 | Chang et al. |
| 5,428,774 A | 6/1995 | Takahashi et al. |
| 5,461,679 A | 10/1995 | Normile et al. |
| 5,465,353 A | 11/1995 | Hull et al. |
| 5,488,664 A | 1/1996 | Shamir |
| 5,493,677 A | 2/1996 | Balogh et al. |
| 5,530,759 A | 6/1996 | Braudaway et al. |
| 5,546,571 A | 8/1996 | Shan et al. |
| 5,546,572 A | 8/1996 | Seto et al. |
| 5,555,354 A | 9/1996 | Strasnick et al. |
| 5,555,378 A | 9/1996 | Gelman et al. |
| 5,557,728 A | 9/1996 | Garrett et al. |
| 5,566,089 A | 10/1996 | Hoogenboom |
| 5,572,260 A | 11/1996 | Onishi et al. |
| 5,579,444 A | 11/1996 | Dalziel et al. |
| 5,579,471 A | 11/1996 | Barber et al. |
| 5,606,655 A | 2/1997 | Arman et al. |
| 5,613,032 A | 3/1997 | Cruz et al. |
| 5,615,112 A | 3/1997 | Liu Sheng et al. |
| 5,617,119 A | 4/1997 | Briggs et al. |
| 5,623,690 A | 4/1997 | Palmer et al. |
| 5,630,121 A | 5/1997 | Braden-Harder et al. |
| 5,642,477 A | 6/1997 | de Carmo et al. |
| 5,655,117 A | 8/1997 | Goldberg et al. |
| 5,664,018 A | 9/1997 | Leighton |
| 5,664,177 A | 9/1997 | Lowry |
| 5,668,897 A | 9/1997 | Stolfo |
| 5,684,715 A | 11/1997 | Palmer |
| 5,694,334 A | 12/1997 | Donahue et al. |
| 5,694,945 A | 12/1997 | Ben-Haim |
| 5,696,964 A | 12/1997 | Cox et al. |
| 5,701,510 A | 12/1997 | Johnson et al. |
| 5,708,805 A | 1/1998 | Okamoto et al. |
| 5,713,021 A | 1/1998 | Kondo et al. |
| 5,721,815 A | 2/1998 | Ottesen et al. |
| 5,724,484 A | 3/1998 | Kagami et al. |
| 5,734,752 A | 3/1998 | Knox |
| 5,734,893 A | 3/1998 | Li et al. |
| 5,742,283 A | 4/1998 | Kim |
| 5,751,286 A | 5/1998 | Barber et al. |
| 5,758,076 A | 5/1998 | Wu et al. |
| 5,767,922 A | 6/1998 | Zabih et al. |
| 5,768,578 A | 6/1998 | Kirk et al. |
| 5,790,703 A | 8/1998 | Wang |
| 5,794,178 A | 8/1998 | Caid et al. |
| 5,794,242 A | 8/1998 | Green et al. |
| 5,802,361 A | 9/1998 | Wang et al. |
| 5,805,733 A | 9/1998 | Wang et al. |
| 5,805,804 A | 9/1998 | Laursen et al. |
| 5,809,139 A | 9/1998 | Girod et al. |
| 5,809,160 A | 9/1998 | Powell et al. |
| 5,821,945 A | 10/1998 | Yeo et al. |
| 5,822,524 A | 10/1998 | Chen et al. |
| 5,825,892 A | 10/1998 | Braudaway et al. |
| 5,848,155 A | 12/1998 | Cox |
| 5,852,435 A | 12/1998 | Vigneaux et al. |
| 5,852,823 A | 12/1998 | De Bonet |
| 5,870,754 A | 2/1999 | Dimitrova et al. |
| 5,873,080 A | 2/1999 | Coden et al. |
| 5,884,298 A | 3/1999 | Smith et al. |
| 5,887,061 A | 3/1999 | Sato |
| 5,893,095 A | 4/1999 | Jain et al. |
| 5,915,027 A | 6/1999 | Cox et al. |
| 5,930,783 A | 7/1999 | Li et al. |
| 5,937,422 A | 8/1999 | Nelson et al. |
| 5,943,422 A | 8/1999 | Van Wie et al. |
| 5,949,885 A | 9/1999 | Leighton |
| 5,960,081 A | 9/1999 | Vynne et al. |
| 5,963,203 A | 10/1999 | Goldberg et al. |
| 5,969,755 A | 10/1999 | Courtney |
| 5,983,218 A | 11/1999 | Syeda-Mahwood |
| 5,987,459 A | 11/1999 | Swanson et al. |
| 5,995,095 A | 11/1999 | Ratakonda |
| 5,995,978 A | 11/1999 | Cullen et al. |
| 6,031,914 A | 2/2000 | Tewfik et al. |
| 6,037,984 A | 3/2000 | Isnardi et al. |
| 6,041,079 A | 3/2000 | Yim |
| 6,047,374 A | 4/2000 | Barton |
| 6,058,186 A | 5/2000 | Enari |
| 6,058,205 A | 5/2000 | Bahl et al. |
| 6,064,764 A | 5/2000 | Bhaskaran et al. |
| 6,070,167 A | 5/2000 | Qian et al. |
| 6,070,228 A | 5/2000 | Belknap et al. |
| 6,072,542 A | 6/2000 | Wilcox et al. |
| 6,075,875 A | 6/2000 | Gu |
| 6,078,664 A | 6/2000 | Moskowitz et al. |
| 6,079,566 A | 6/2000 | Eleftheriadis et al. |
| 6,081,278 A | 6/2000 | Chen |
| 6,092,072 A | 7/2000 | Guha et al. |
| 6,100,930 A | 8/2000 | Kolczynski |
| 6,104,411 A | 8/2000 | Ito et al. |
| 6,108,434 A | 8/2000 | Cox et al. |
| 6,115,717 A | 9/2000 | Mehrotra et al. |
| 6,122,403 A | 9/2000 | Rhoads |
| 6,125,229 A | 9/2000 | Dimitrova et al. |
| 6,154,755 A | 11/2000 | Dellert et al. |
| 6,157,745 A | 12/2000 | Salembier |
| 6,157,746 A | 12/2000 | Sodagar et al. |
| 6,172,675 B1 | 1/2001 | Ahmad et al. |
| 6,178,416 B1 | 1/2001 | Thompson et al. |
| 6,185,329 B1 | 2/2001 | Zhang et al. |
| 6,195,458 B1 | 2/2001 | Warnick et al. |
| 6,208,735 B1 | 3/2001 | Cox et al. |
| 6,208,745 B1 | 3/2001 | Florencio et al. |
| 6,222,932 B1 | 4/2001 | Rao et al. |
| 6,223,183 B1 | 4/2001 | Smith et al. |
| 6,236,395 B1 | 5/2001 | Sezan et al. |
| 6,240,424 B1 | 5/2001 | Hirata |
| 6,243,419 B1 | 6/2001 | Satou et al. |
| 6,246,804 B1 | 6/2001 | Sato et al. |
| 6,252,975 B1 | 6/2001 | Bozdagi et al. |
| 6,269,358 B1 | 7/2001 | Hirata |
| 6,275,599 B1 | 8/2001 | Adler et al. |
| 6,282,299 B1 | 8/2001 | Tewfik et al. |
| 6,282,300 B1 | 8/2001 | Bloom et al. |
| 6,285,995 B1 | 9/2001 | Abdel-Mottaleb et al. |
| 6,297,797 B1 | 10/2001 | Takeuchi et al. |
| 6,327,390 B1 | 12/2001 | Sun et al. |
| 6,332,030 B1 | 12/2001 | Manjunath et al. |
| 6,339,450 B1 | 1/2002 | Chang et al. |
| 6,356,309 B1 | 3/2002 | Masaki et al. |
| 6,360,234 B2 | 3/2002 | Jain et al. |
| 6,366,314 B1 | 4/2002 | Goudezeune et al. |
| 6,366,701 B1 | 4/2002 | Chalom et al. |
| 6,385,329 B1 | 5/2002 | Sharma et al. |
| 6,385,602 B1 | 5/2002 | Tso et al. |
| 6,393,394 B1 | 5/2002 | Ananthapadmanabhan et al. |
| 6,404,925 B1 | 6/2002 | Foote et al. |
| 6,418,232 B1 | 7/2002 | Nakano et al. |
| 6,418,421 B1 | 7/2002 | Hurtado et al. |
| 6,442,538 B1 | 8/2002 | Nojima |
| 6,453,053 B1 | 9/2002 | Wakasu |
| 6,466,940 B1 | 10/2002 | Mills |
| 6,473,459 B1 | 10/2002 | Sugano et al. |
| 6,476,814 B1 | 11/2002 | Garvey |
| 6,487,301 B1 | 11/2002 | Zhao |
| 6,499,105 B1 | 12/2002 | Yoshiura et al. |
| 6,526,099 B1 | 2/2003 | Christopoulos et al. |
| 6,532,541 B1 | 3/2003 | Chang et al. |
| 6,546,135 B1 | 4/2003 | Lin et al. |
| 6,549,911 B2 | 4/2003 | Gustman |
| 6,556,695 B1 | 4/2003 | Packer et al. |
| 6,556,958 B1 | 4/2003 | Chickering |
| 6,560,284 B1 | 5/2003 | Girod et al. |
| 6,567,805 B1 | 5/2003 | Johnson et al. |
| 6,581,058 B1 | 6/2003 | Fayyad et al. |
| 6,606,329 B1 | 8/2003 | Herrmann |
| 6,606,393 B1 | 8/2003 | Xie et al. |
| 6,628,824 B1 | 9/2003 | Belanger |
| 6,643,387 B1 | 11/2003 | Sethuraman et al. |
| 6,654,931 B1 | 11/2003 | Haskell et al. |
| 6,678,389 B1 | 1/2004 | Sun et al. |
| 6,683,966 B1 | 1/2004 | Tian et al. |

(56) References Cited

U.S. PATENT DOCUMENTS

| | | |
|---|---|---|
| 6,700,935 B2 | 3/2004 | Lee |
| 6,701,309 B1 | 3/2004 | Beeferman et al. |
| 6,708,055 B2 | 3/2004 | Geiser et al. |
| 6,714,909 B1 | 3/2004 | Gibbon et al. |
| 6,716,175 B2 | 4/2004 | Geiser et al. |
| 6,718,047 B2 | 4/2004 | Rhoads |
| 6,721,733 B2 | 4/2004 | Lipson et al. |
| 6,725,372 B1 | 4/2004 | Lewis et al. |
| 6,735,253 B1 | 5/2004 | Chang et al. |
| 6,741,655 B1 | 5/2004 | Chang et al. |
| 6,757,407 B2 | 6/2004 | Bruckstein et al. |
| 6,778,223 B2 | 8/2004 | Abe |
| 6,792,434 B2 | 9/2004 | Moghaddam et al. |
| 6,807,231 B1 | 10/2004 | Wiegand et al. |
| 6,816,836 B2 | 11/2004 | Basu et al. |
| 6,847,980 B1 | 1/2005 | Benitez et al. |
| 6,879,703 B2 | 4/2005 | Lin et al. |
| 6,886,013 B1 | 4/2005 | Beranek |
| 6,940,910 B2 | 9/2005 | Jun et al. |
| 6,941,325 B1 | 9/2005 | Benitez et al. |
| 6,950,542 B2 | 9/2005 | Roesch |
| 6,970,602 B1 | 11/2005 | Smith et al. |
| 7,010,751 B2 | 3/2006 | Shneiderman |
| 7,072,398 B2 | 7/2006 | Ma |
| 7,093,028 B1 | 8/2006 | Shao et al. |
| 7,103,225 B2 | 9/2006 | Yang et al. |
| 7,143,434 B1 | 11/2006 | Paek et al. |
| 7,145,946 B2 | 12/2006 | Lee |
| 7,154,560 B1 | 12/2006 | Chang et al. |
| 7,184,959 B2 | 2/2007 | Gibbon et al. |
| 7,185,049 B1 | 2/2007 | Benitez et al. |
| 7,254,285 B1 | 8/2007 | Paek et al. |
| 7,308,443 B1 | 12/2007 | Lee et al. |
| 7,313,269 B2 | 12/2007 | Xie et al. |
| 7,327,885 B2 | 2/2008 | Divakaran et al. |
| 7,339,992 B2 | 3/2008 | Chang et al. |
| 7,386,806 B2 | 6/2008 | Wroblewski |
| 7,398,275 B2 | 7/2008 | Rising et al. |
| 7,403,302 B2 | 7/2008 | Gann |
| 7,406,409 B2 | 7/2008 | Otsuka et al. |
| 7,409,144 B1 | 8/2008 | McGrath et al. |
| 7,437,004 B2 | 10/2008 | Baatz et al. |
| 7,496,830 B2 | 2/2009 | Rubin et al. |
| 7,519,217 B2 | 4/2009 | Liu et al. |
| 7,574,409 B2 | 8/2009 | Patinkin |
| 7,624,337 B2 | 11/2009 | Sull et al. |
| 7,636,662 B2 | 12/2009 | Dimtrova et al. |
| 7,653,635 B1 | 1/2010 | Paek et al. |
| 7,676,820 B2 | 3/2010 | Snijder et al. |
| 7,720,851 B2 | 5/2010 | Chang et al. |
| 7,733,956 B1 | 6/2010 | Kalra et al. |
| 7,738,550 B2 | 6/2010 | Kuhn |
| 7,756,338 B2 | 7/2010 | Wilson et al. |
| 7,773,813 B2 | 8/2010 | Hua et al. |
| 7,809,192 B2 | 10/2010 | Gokturk et al. |
| 7,817,722 B2 | 10/2010 | Chang et al. |
| 7,817,855 B2 | 10/2010 | Yuille et al. |
| 7,884,567 B2 | 2/2011 | Kim et al. |
| 7,996,762 B2 | 8/2011 | Qi et al. |
| 8,010,296 B2 | 8/2011 | Loo et al. |
| 8,019,763 B2 | 9/2011 | Wang et al. |
| 8,135,221 B2 | 3/2012 | Jiang et al. |
| 8,145,677 B2 | 3/2012 | Al-Shameri |
| 8,218,617 B2 | 7/2012 | Kim et al. |
| 8,332,333 B2 | 12/2012 | Agarwal |
| 2001/0000962 A1 | 5/2001 | Rajan |
| 2002/0021828 A1 | 2/2002 | Papier et al. |
| 2002/0118748 A1 | 8/2002 | Inomata et al. |
| 2002/0157116 A1 | 10/2002 | Jasinschi |
| 2002/0169771 A1 | 11/2002 | Melmon et al. |
| 2003/0013951 A1 | 1/2003 | Stefanescu et al. |
| 2003/0046018 A1 | 3/2003 | Kohlmorgen et al. |
| 2003/0195883 A1 | 10/2003 | Mojsilovic et al. |
| 2003/0229278 A1 | 12/2003 | Sinha |
| 2004/0057081 A1 | 3/2004 | Kubota |
| 2004/0131121 A1 | 7/2004 | Dumitras et al. |
| 2004/0210819 A1 | 10/2004 | Alonso |
| 2005/0076055 A1 | 4/2005 | Mory et al. |
| 2005/0201619 A1 | 9/2005 | Sun et al. |
| 2005/0210043 A1 | 9/2005 | Manasse |
| 2005/0238238 A1 | 10/2005 | Xu et al. |
| 2006/0026588 A1 | 2/2006 | Illowsky et al. |
| 2006/0167784 A1 | 7/2006 | Hoffberg |
| 2006/0200260 A1 | 9/2006 | Hoffberg et al. |
| 2006/0206882 A1 | 9/2006 | Illowsky et al. |
| 2006/0224532 A1 | 10/2006 | Duan et al. |
| 2006/0258419 A1 | 11/2006 | Winkler et al. |
| 2006/0293921 A1 | 12/2006 | McCarthy et al. |
| 2007/0033170 A1 | 2/2007 | Sull et al. |
| 2007/0038612 A1 | 2/2007 | Sull et al. |
| 2007/0044010 A1 | 2/2007 | Sull et al. |
| 2007/0078846 A1 | 4/2007 | Gulli et al. |
| 2007/0087756 A1 | 4/2007 | Hoffberg |
| 2007/0174790 A1 | 7/2007 | Jing et al. |
| 2007/0195106 A1 | 8/2007 | Lin et al. |
| 2007/0237426 A1 | 10/2007 | Xie et al. |
| 2007/0245400 A1 | 10/2007 | Paek et al. |
| 2008/0055479 A1 | 3/2008 | Shehata et al. |
| 2008/0097939 A1 | 4/2008 | Guyon et al. |
| 2008/0181308 A1 | 7/2008 | Wang et al. |
| 2008/0193016 A1 | 8/2008 | Lim et al. |
| 2008/0222670 A1 | 9/2008 | Lee et al. |
| 2008/0266300 A1 | 10/2008 | Deering et al. |
| 2008/0298464 A1 | 12/2008 | Hinz et al. |
| 2008/0303942 A1 | 12/2008 | Chang et al. |
| 2008/0304743 A1 | 12/2008 | Tang et al. |
| 2009/0055094 A1 | 2/2009 | Suzuki |
| 2009/0132561 A1 | 5/2009 | Cormode et al. |
| 2009/0290635 A1 | 11/2009 | Kim et al. |
| 2009/0316778 A1 | 12/2009 | Kim et al. |
| 2010/0082614 A1 | 4/2010 | Yang et al. |
| 2010/0172591 A1 | 7/2010 | Ishikawa |
| 2011/0025710 A1 | 2/2011 | Kennedy et al. |
| 2011/0064136 A1 | 3/2011 | Chang et al. |
| 2011/0093492 A1 | 4/2011 | Sull et al. |
| 2011/0145232 A1 | 6/2011 | Chang et al. |
| 2011/0255605 A1 | 10/2011 | Chang et al. |

FOREIGN PATENT DOCUMENTS

| | | |
|---|---|---|
| EP | 0953938 | 11/1999 |
| JP | 2004049471 | 2/1992 |
| JP | 1996317384 | 11/1996 |
| WO | WO98/33323 | 7/1998 |
| WO | WO00/28440 | 5/2000 |
| WO | WO00/49797 | 8/2000 |

OTHER PUBLICATIONS

U.S. Appl. No. 11/615,120, Apr. 6, 2010 Issue Fee payment.
U.S. Appl. No. 11/615,120, Jan. 14, 2010 Notice of Allowance.
U.S. Appl. No. 11/615,120, Sep. 4, 2009 Response to Non-Final Office Action.
U.S. Appl. No. 11/615,120, May 4, 2009 Non-Final Office Action.
U.S. Appl. No. 11/615,120, Feb. 16, 2009 Response to Restriction Requirement.
U.S. Appl. No. 11/615,120, Jan. 16, 2009 Restriction Requirement.
U.S. Appl. No. 12/574,716, Feb. 1, 2012 Issue Fee payment.
U.S. Appl. No. 12/574,716, Nov. 10, 2011 Notice of Allowance.
U.S. Appl. No. 11/448,114, Jan. 2, 2013 Issue Fee payment.
U.S. Appl. No. 11/448,114, Oct. 2, 2012 Notice of Allowance.
U.S. Appl. No. 11/448,114, Jul. 9, 2012, Amendment and Request for Continued Examination (RCE).
U.S. Appl. No. 11/448,114, May 16, 2012 Notice of Appeal filed.
U.S. Appl. No. 12/874,337, Aug. 23, 2012 Restriction Requirement.
U.S. Appl. No. 12/969,101, Dec. 21, 2012 Issue Fee payment.
U.S. Appl. No. 12/969,101, Oct. 9, 2012 Notice of Allowance.
U.S. Appl. No. 12/969,101, Aug. 23, 2012 Response to Non-Final Office Action.
U.S. Appl. No. 12/969,101, May 24, 2012 Non-Final Office Action.
U.S. Appl. No. 13/165,553, Nov. 23, 2012 Restriction Requirement.

(56) References Cited

OTHER PUBLICATIONS

U.S. Appl. No. 11/960,424, Dec. 31, 2012 Terminal Disclaimer Decision.
U.S. Appl. No. 11/960,424, Dec. 20, 2012 Response to Non-Final Office Action and Terminal Disclaimer filed.
U.S. Appl. No. 11/960,424, Jun. 29, 2012 Non-Final Office Action.
U.S. Appl. No. 12/548,199, Feb. 12, 2013 Response to Non-Final Office Action.
U.S. Appl. No. 12/548,199, Oct. 16, 2012 Non-Final Office Action.
U.S. Appl. No. 11/846,088, Nov. 29, 2012 Response to Non-Final Office Action.
U.S. Appl. No. 11/846,088, Jun. 7, 2012 Non-Final Office Action.
U.S. Appl. No. 11/846,088, Apr. 9, 2012 Response to Restriction Requirement.
U.S. Appl. No. 11/846,088, Nov. 10, 2011 Restriction Requirement.
U.S. Appl. No. 10/965,040, Jun. 7, 2012 Issue Fee payment.
U.S. Appl. No. 10/965,040, Mar. 15, 2012 Notice of Allowance.
U.S. Appl. No. 10/965,040, Mar. 9, 2012 Terminal Disclaimer Review Decision.
U.S. Appl. No. 10/965,040, Mar. 2, 2012 Response to Non-Final Office Action and Terminal Disclaimer filed.
Amir et al., "IBM research TRECVID-2003 video retrieval system", *Proc. NIST Text Retrieval Conf. (TREC)*, 2003.
Anemueller et al., "Biologically motivated audio-visual cue integration for object categorization", *Proc. International Conference on Cognitive Systems*, 2008.
Barzelay et al., "Harmony in motion", *Proc. IEEE Conference Computer Vision and Pattern Recognition*, pp. 1-8, 2007.
Beal et al., "A graphical model for audiovisual object tracking", *IEEE Trans. Pattern Analysis and Machine Intelligence*, 25:828-836, 2003.
Chang et al., "Large-scale multimodal semantic concept detection for consumer video", *Proc. 9th ACM SIGMM International Workshop on Multimedia Information Retrieval*, 2007.
Chen et al., "Image categorization by learning and reasoning with regions", *Journal of Machine Learning Research*, 5:913-939, 2004.
Cristani et al., "Audio-visual event recognition in surveillance video sequences", *IEEE Trans. Multimedia*, 9:257-267, 2007.
Dalai et al., "Histograms of oriented gradients for human detection", *Proc. IEEE Conference Computer Vision and Pattern Recognition*, pp. 886-893, 2005.
Deng et al., "Unsupervised segmentation of color-texture regions in images and video", *IEEE Trans. Pattern Analysis and Machine Intelligence*, 23:800-810, 2001.
Friedman, et al., "Additive logistic regression: a statistical view of boosting", *Annals of Statistics*, 28:337-407, 2000.
Gholamhosein et al., "Semantic Clustering and Querying on Heterogeneous Features for Visual Data", *Proceedings of the ACM Multimedia 98, MM '98, Bristol, Sep. 12-16, 1998, ACM International Multimedia Conference*, New York, NY: ACM US, vol. Conf. 6, Sep. 12, 1998, pp. 3-12, XP000977482.
Han et al. "Incremental density approximation and kernel-based bayesian filtering for object tracking", *Proc. IEEE Conference Computer Vision and Pattern Recognition*, pp. 638-644, 2004.
Hellman et al., "Probability of error, equivocation, and the chernoff bound", *IEEE Trans. on Information Theory*, 16(4):368-372, 1970.
Hershey et al., "Audio-vision: using audio-visual synchrony to locate sounds", *Proc. Advances in Neural Information Processing Systems*, 1999.
Iwano et al., "Audio-visual speech recognition using lip information extracted from side-face images", *EURASIP Journal on Audio, Speech, and Music Processing*, 2007.
Lowe "Distinctive image features from scale-invariant keypoints", *International Journal of Computer Vision*, 60:91-110, 2004.
Lucas, et al. "An iterative image registration technique with an application to stereo vision", *Proc. Imaging understanding workshop*, pp. 121-130, 1981.
Mallat et al., "Matching pursuits with time-frequency dictionaries", *IEEE Transaction on Signal Processing*, 41(2): 3397-3415, 1993.
Maron et al., "A framework for multiple-instance learning", *Proc. Advances in Neural Information Processing Systems*, pp. 570-576, 1998.
Naphade et al., "A factor graph fraemwork for semantic video indexing", *IEEE Trans on CSVT*, 12(1):40-52, 2002.
Ogle et al., "Fingerprinting to identify repeated sound events in long-duration personal audio recordings", *Proc. Int. Conf. Acoustics, Speech and Signal Processing*, pp. I-233-I-236, 2007.
Pack et al., "Experiments in constructing belief networks for image classification systems", *Proc. ICIP*, Vancouver, Canada, 2000.
Smith et al., "Multimedia semantic indexing using model vectors", *Proc. ICME*, 3:445-448, 2003.
Vasconcelos, eature selection by maximum marginal diversity: optimality and implications for visual recognition, *CVPR 1*:762-769, 2003.
Wang et al., "Learning Semantic Scene Models by Trajectory Analysis", *Proc. European Conference on Computer Vision*, pp. 110-123, 2006.
Wu, et al., "Multimodal information fusion for video concept detection," Proc. International Conference Image Processing, pp. 2391-2394, 2004.
Yang et al., "Region-based image annotation using asymmetrical support vector machine-based multiple-instance learning", *Proc. IEEE Conference Computer Vision and Pattern Recognition*, pp. 2057-2063, 2006.
Zhou et al., "Object tracking using sift features and mean shift," *Computer Vision and Image Understanding*, 113:345-352, 2009.
U.S. Appl. No. 11/846,088, Mar. 7, 2013 Final Office Action.
U.S. Appl. No. 12/548,199, Apr. 22, 2013 Final Office Action.
U.S. Appl. No. 12/874,337, May 22, 2013 Non-Final Office Action.
Belkin, et al., "Manifold Regularization: A Geometric Framework for Learning from Labeled and Unlabeled Examples", *Journal of Machine Learning Research 7*, pp. 2399-2434 (2006).
Ham, et al., "Semisupervised Alignment of Manifolds", *Proceedings of the Annual Conference on Uncertainty in Artificial Intelligence*, Z. Ghahramani and R. Cowell, EDS., 10: 8 pages (2005).
Zhu, "Semi-Supervised Learning with Graphs", *Canergie Mellon University*, 164 pages (2005).
U.S. Appl. No. 13/165,553, Jun. 20, 2013 Non-Final Office Action.
U.S. Appl. No. 11/960,424, Jun. 7, 2013 Issue Fee payment.
U.S. Appl. No. 12/861,377, Mar. 13, 2013 Restriction Requirement.
U.S. Appl. No. 10/482,074, filed Dec. 24, 2003 (Abandoned).
U.S. Appl. No. 13/078,626, filed Apr. 1, 2011.
U.S. Appl. No. 09/423,770, filed Nov. 12, 1999 (Abandoned).
U.S. Appl. No. 10/333,030, filed Jun. 6, 2003 (Abandoned).
U.S. Appl. No. 09/623,277, filed Sep. 1, 2000, (Abandoned).
U.S. Appl. No. 10/149,685, filed Jun. 13, 2002, (Abandoned).
U.S. Appl. No. 09/359,836, filed Jul. 23, 1999, (Abandoned).
U.S. Appl. No. 10/491,460, filed Apr. 1, 2004, (Abandoned).
U.S. Appl. No. 11/506,060, filed Aug. 16, 2006, (Abandoned).
U.S. Appl. No. 13/165,553, filed Jun. 21, 2011.
U.S. Appl. No. 10/482,074, Jun. 18, 2008 Notice of Abandonment.
U.S. Appl. No. 10/482,074, Nov. 14, 2007 Non-Final Office Action.
U.S. Appl. No. 10/965,040, Nov. 2, 2011 Notice of Appeal.
U.S. Appl. No. 10/965,040, Aug. 10, 2011 Advisory Action.
U.S. Appl. No. 10/965,040, Aug. 2, 2011 Response to Final Office Action.
U.S. Appl. No. 10/965,040, May 13, 2011 Final Office Action.
U.S. Appl. No. 10/965,040, Feb. 25, 2011 Response to Non-Final Office Action.
U.S. Appl. No. 10/965,040, Oct. 29, 2010 Non-Final Office Action.
U.S. Appl. No. 11/448,114, Nov. 21, 2011 Final Office Action.
U.S. Appl. No. 11/448,114, Oct. 10, 2011 Response to Non-Final Office Action.
U.S. Appl. No. 11/448,114, Jul. 8, 2011 Non-Final Office Action.
U.S. Appl. No. 11/448,114, Apr. 27, 2011 Response to Non-Final Office Action.
U.S. Appl. No. 11/448,114, Oct. 28, 2010 Non-Final Office Action.
U.S. Appl. No. 11/448,114, Apr. 1, 2010 Amendment and Request for Continued Examination (RCE).
U.S. Appl. No. 11/448,114, Nov. 25, 2009 Final Office Action.
U.S. Appl. No. 11/448,114, Oct. 19, 2009 Response to Non-Compliant Response.

(56) References Cited

OTHER PUBLICATIONS

U.S. Appl. No. 11/448,114, Oct. 6, 2009 Notice of Non-Compliant Response.
U.S. Appl. No. 11/448,114, Aug. 12, 2009 Response to Non-Final Office Action.
U.S. Appl. No. 11/448,114, Mar. 16, 2009 Non-Final Office Action.
U.S. Appl. No. 09/423,770, Feb. 20, 2004 Notice of Abandonment.
U.S. Appl. No. 09/423,770, Jul. 2, 2003 Non-Final Office Action.
U.S. Appl. No. 10/333,030, Jun. 25, 2010 Notice of Abandonment.
U.S. Appl. No. 10/333,030, Sep. 22, 2009 Non-Final Office Action.
U.S. Appl. No. 10/333,030, Jul. 9, 2009 Amendment and Request for Continued Examination (RCE).
U.S. Appl. No. 10/333,030, Feb. 26, 2009 Final Office Action.
U.S. Appl. No. 10/333,030, Nov. 21, 2008 Response to Non-Final Office Action.
U.S. Appl. No. 10/333,030, May 22, 2008 Non-Final Office Action.
U.S. Appl. No. 10/333,030, Apr. 15, 2008 Supplemental Response to Notice of Non-Compliant.
U.S. Appl. No. 10/333,030, Apr. 10, 2008 Response to Notice of Non-Compliant.
U.S. Appl. No. 10/333,030, Feb. 15, 2008 Notice of Non-Compliant.
U.S. Appl. No. 10/333,030, Jan. 24, 2008 Amendment and Request for Continued Examination (RCE).
U.S. Appl. No. 10/333,030, Oct. 25, 2007 Final Office Action.
U.S. Appl. No. 10/333,030, Aug. 28, 2007 Response to Non-Final Office Action.
U.S. Appl. No. 10/333,030, Apr. 30, 2007 Non-Final Office Action.
U.S. Appl. No. 10/333,030, Mar. 20, 2007 Response to Non-Final Office Action.
U.S. Appl. No. 10/333,030, Dec. 20, 2006 Non-Final Office Action.
U.S. Appl. No. 09/423,409, Nov. 21, 2003 Notice of Allowance.
U.S. Appl. No. 09/423,409, Nov. 6, 2003 Response to Final Office Action.
U.S. Appl. No. 09/423,409, Aug. 7, 2003 Final Office Action.
U.S. Appl. No. 09/423,409, Jun. 2, 2003 Response to Non-Final Office Action.
U.S. Appl. No. 09/423,409, Dec. 10, 2002 Non-Final Office Action.
U.S. Appl. No. 09/623,277, Mar. 23, 2006 Notice of Abandonment.
U.S. Appl. No. 09/623,277, Aug. 10, 2005 Restriction Requirement.
U.S. Appl. No. 09/607,974, Jul. 9, 2004 Notice of Allowance.
U.S. Appl. No. 09/607,974, Apr. 26, 2004 Response to Non-Final Office Action.
U.S. Appl. No. 09/607,974, Dec. 11, 2003 Non-Final Office Action.
U.S. Appl. No. 09/607,974, Nov. 10, 2003 Request for Continued Examination (RCE).
U.S. Appl. No. 09/607,974, Sep. 3, 2003 Advisory Action.
U.S. Appl. No. 09/607,974, Jul. 30, 2003 Response to Final Office Action.
U.S. Appl. No. 09/607,974, May 9, 2003 Final Office Action.
U.S. Appl. No. 09/607,974, Apr. 4, 2003 Response to Notice of Informality or Non-Responsive Amendment.
U.S. Appl. No. 09/607,974, Feb. 24, 2003 Notice of Informal or Non-Responsive Amendment.
U.S. Appl. No. 09/607,974, Jan. 8, 2003 Response to Non-Final Office Action.
U.S. Appl. No. 09/607,974, Jul. 1, 2002 Non-Final Office Action.
U.S. Appl. No. 09/530,308, Apr. 20, 2006 Notice of Allowance.
U.S. Appl. No. 09/530,308, Jan. 23, 2006 Response to Non-Final Office Action.
U.S. Appl. No. 09/530,308, Oct. 20, 2005 Non-Final Office Action.
U.S. Appl. No. 09/530,308, Jul. 11, 2005 Filed Appeal Brief.
U.S. Appl. No. 09/530,308, May 12, 2005 Filed Notice of Appeal.
U.S. Appl. No. 09/530,308, Feb. 9, 2005 Final Office Action.
U.S. Appl. No. 09/530,308, Sep. 27, 2004 Response to Non-Final Office Action.
U.S. Appl. No. 09/530,308, Mar. 24, 2004 Non-Final Office Action.
U.S. Appl. No. 09/530,308, Jan. 12, 2004 Response to Non-Final Office Action.
U.S. Appl. No. 09/530,308, Oct. 2, 2003 Non-Final Office Action.
U.S. Appl. No. 09/530,308, Jul. 14, 2003 Response to Non-Final Office Action.
U.S. Appl. No. 09/530,308, Nov. 20, 2002 Non-Final Office Action.
U.S. Appl. No. 10/220,776, Aug. 23, 2004 Notice of Allowance.
U.S. Appl. No. 10/149,685, Feb. 7, 2008 Notice of Abandonment.
U.S. Appl. No. 10/149,685, Jul. 31, 2007 Non-Final Office Action.
U.S. Appl. No. 10/149,685, May 7, 2007 Response to Non-Final Office Action.
U.S. Appl. No. 10/149,685, Feb. 6, 2007 Non-Final Office Action.
U.S. Appl. No. 09/889,859, Mar. 22, 2004 Notice of Allowance.
U.S. Appl. No. 09/889,859, Jan. 12, 2004 Response to Non-Final Office Action.
U.S. Appl. No. 09/889,859, Sep. 10, 2003 Non-Final Office Action.
U.S. Appl. No. 09/359,836, Mar. 17, 2008 Notice of Abandonment.
U.S. Appl. No. 09/359,836, Aug. 10, 2007 Final Office Action.
U.S. Appl. No. 09/359,836, May 11, 2007 Response to Non-Final Office Action.
U.S. Appl. No. 09/359,836, Dec. 15, 2006 Non-Final Office Action.
U.S. Appl. No. 09/359,836, Sep. 21, 2006 Amendment and Request for Continued Examination (RCE).
U.S. Appl. No. 09/359,836, May 18, 2004 Final Office Action.
U.S. Appl. No. 09/359,836, Mar. 5, 2004 Response to Non-Final Office Action.
U.S. Appl. No. 09/359,836, Aug. 29, 2003 Non-Final Office Action.
U.S. Appl. No. 09/830,899, Nov. 4, 2009 Notice of Allowance.
U.S. Appl. No. 09/830,899, Oct. 1, 2009 Request for Continued Examination (RCE).
U.S. Appl. No. 09/830,899, Sep. 4, 2009 Notice of Allowance.
U.S. Appl. No. 09/830,899, Jun. 29, 2009 Response to Non-Final Office Action.
U.S. Appl. No. 09/830,899, Feb. 2, 2009 Non-Final Office Action.
U.S. Appl. No. 09/830,899, Dec. 22, 2008 Response to Non-Final Office Action.
U.S. Appl. No. 09/830,899, Oct. 9, 2008 Non-Final Office Action.
U.S. Appl. No. 09/830,899, Jul. 15, 2008 Amendment and Request for Continued Examination.
U.S. Appl. No. 09/830,899, May 16, 2007 Filed Reply Brief.
U.S. Appl. No. 09/830,899, Apr. 5, 2007 Examiner's Answer to Appeal Brief.
U.S. Appl. No. 09/830,899, Dec. 18, 2006 Filed Appeal Brief.
U.S. Appl. No. 09/830,899, Nov. 3, 2006 Filed Notice of Appeal.
U.S. Appl. No. 09/830,899, Jul. 3, 2006 Final Office Action and Examiner Interview Summary.
U.S. Appl. No. 09/830,899, Apr. 13, 2006 Non-Final Office Action.
U.S. Appl. No. 09/830,899, Mar. 3, 2006 Filed Appeal Brief.
U.S. Appl. No. 09/830,899, Feb. 15, 2006 Notice of Defective Appeal Brief.
U.S. Appl. No. 09/830,899, Dec. 19, 2005 Filed Appeal Brief.
U.S. Appl. No. 09/830,899, Nov. 9, 2005 Pre-Appeal Brief Conference Decision.
U.S. Appl. No. 09/830,899, Oct. 17, 2005 Amendment, Notice of Appeal and Pre-Appeal Brief Request.
U.S. Appl. No. 09/830,899, Jul. 5, 2005 Final Office Action.
U.S. Appl. No. 09/830,899, Dec. 27, 2004 Response to Notice of Non-Compliant.
U.S. Appl. No. 09/830,899, Dec. 7, 2004 Notice of Non-Compliant.
U.S. Appl. No. 09/830,899, Jul. 6, 2004 Amendment and Request for Continued Examination (RCE).
U.S. Appl. No. 09/830,899, Mar. 12, 2004 Final Office Action.
U.S. Appl. No. 09/830,899, Dec. 11, 2003 Response to Non-Final Office Action.
U.S. Appl. No. 09/830,899, Aug. 13, 2003 Non-Final Office Action.
U.S. Appl. No. 10/491,460, Jul. 11, 2006 Notice of Abandonment.
U.S. Appl. No. 10/728,345, Jun. 15, 2010 Notice of Allowance.
U.S. Appl. No. 10/728,345, Mar. 10, 2010 Response to Non-Final Office Action.
U.S. Appl. No. 10/728,345, Dec. 24, 2009 Non-Final Office Action.
U.S. Appl. No. 10/728,345, Oct. 5, 2009 Amendment and Request for Continued Examination (RCE).
U.S. Appl. No. 10/728,345, Jul. 9, 2009 Final Office Action.
U.S. Appl. No. 10/728,345, Apr. 9, 2009 Response to Non-Final Office Action.
U.S. Appl. No. 10/728,345, Dec. 10, 2008 Non-Final Office Action.

(56) References Cited

OTHER PUBLICATIONS

U.S. Appl. No. 10/728,345, Sep. 30, 2008 Response to Non-Final Office Action.
U.S. Appl. No. 10/728,345, Jun. 30, 2008 Non-Final Office Action.
U.S. Appl. No. 10/494,739, Oct. 10, 2007 Notice of Allowance.
U.S. Appl. No. 09/831,215, Sep. 6, 2006 Notice of Allowance.
U.S. Appl. No. 09/235,862, Oct. 25, 2002 Notice of Allowance.
U.S. Appl. No. 09/235,862, Oct. 21, 2002 Supplemental Response to Final Office Action.
U.S. Appl. No. 09/235,862, Oct. 10, 2002 Advisory Action.
U.S. Appl. No. 09/235,862, Sep. 30, 2002 Response to Final Office Action.
U.S. Appl. No. 09/235,862, Apr. 22, 2002 Final Office Action.
U.S. Appl. No. 09/235,862, Mar. 12, 2002 Response to Non-Final Office Action.
U.S. Appl. No. 09/235,862, Nov. 7, 2001 Non-Final Office Action.
U.S. Appl. No. 09/831,218, Mar. 1, 2006 Notice of Allowance.
U.S. Appl. No. 09/831,218, Feb. 10, 2006 Response to Final Office Action.
U.S. Appl. No. 09/831,218, Dec. 29, 2005 Final Office Action.
U.S. Appl. No. 09/831,218, Nov. 28, 2005 Response to Non-Final Office Action.
U.S. Appl. No. 09/831,218, Aug. 24, 2005 Non-Final Office Action.
U.S. Appl. No. 11/506,060, Dec. 1, 2011 Notice of Abandonment.
U.S. Appl. No. 11/506,060, May 10, 2011 Final Office Action.
U.S. Appl. No. 11/506,060, Apr. 12, 2011 Response to Non-Final Office Action.
U.S. Appl. No. 11/506,060, Oct. 19, 2010 Non-Final Office Action.
U.S. Appl. No. 11/506,060, Mar. 3, 2010 Amendment and Request for Continued Examination (RCE).
U.S. Appl. No. 11/506,060, Nov. 18, 2009 Final Office Action.
U.S. Appl. No. 11/506,060, Aug. 13, 2009 Response to Non-Final Office Action.
U.S. Appl. No. 11/506,060, Mar. 11, 2009 Non-Final Office Action.
Infotouch: An Explorative Multi-Touch Interface for Tagged Photo Collections Linkoping University. Purportedly posted to Youtube on May 31, 2007 (http://www.youtube.com/watch?v—DHMJJwouq51). p. 1.
Zavesky et al., "Low-Latency Query Formulation and Result Exploration for Concept-Based Visual Search,", ACM Multimedia Information Retrieval Conference, Oct. 2008, Vancouver, Canada; pp. 1-23.
Dimitrova et al., "Motion Recovery for Video Contect Classification,", Arizona State University, Temple; Transactions on Information Systems; Oct. 13, 1995; No. 4, pp. 408-439; New York, NY, U.S.A.
Chang et al., "Multimedia Search and Retrieval", Published as a chapter in Advances in Multimedia: System, Standard, and Networks, A. Puri and T. Chen (eds.). New York: Marcel Dekker, 1999; pp. 559-584.
M. Bierling, "Displacement Estimation by Hierarchical Block Matching", SPIE Visual Commun. & Image Processing (1988) vol. 1001; pp. 942-951.
Hirata et al., "Query by Visual Example, Content Based Image Retrieval, Advances in Database Technology—EDBT"; Lecture Notes in Computer Science (1992, A. Pirotte et al. eds.)vol. 580; pp. 56-71.
T. Minka, "An Image Database Browed that Learns from User Interaction" MIT Media Laboratory Perceptual Computing Section, TR#365 (1996); pp. 1-55.
W. Niblack et al. "The QBIC Project: Querying Images by Content Using Color, Texture and Shape" in Storage and Retrieval for Image and Video Databases, Wayne Niblack, Editor, Proc. SPIE 1908, pp. 173-181 (1993).
Saber et al., "Region-based shape matching for automatic image annotation and query-by-example" 8 Visual Comm. and Image Representation (1997) pp. 1-40.
Sun, et al., "Architectures for MPEG Compressed Bitstream Scaling." Transactions on Circuits and Systems for Video Technology, vol. 6(2), Apr. 1996.

MPEG-7 Requirements; Oct. 1998.
MPEG-7 Context and Objectives; Oct. 1998.
MPEG-7 Proposal Package Description; Oct. 1998.
Oomoto E et al: "OVID: design and implementation of a video-object database system" IEEE Transactions on Knowledge and Data Engineering, IEEE, Inc. New York, US, vol. 5, No. 4, Aug. 1993, pp. 629-643, XP002134326 ISSN: 1041-4347.
Chung-Sheng Li et al: "Multimedia content descriptioin in the InfoPyramid" Acoustics, Speech and Signal Processing, 1998. Porceedings of the 1998 IEEE International Conference on Seattle, WA, USA May 12-15, 1998, New York, NY USA, IEEE, US, May 12, 1998, pp. 3789-3792, XP010279595 ISBN: 0-7803-4428-6.
Bayram et al.: "Image Manipulation Detection,", Journal of Electronic Imaging 15(4), 041102, (Oct.-Dec. 2006).
Fridich et al.: "Detection of Copy-Move Forgery in Digital Images", *Proc. of DFRWS 2003*, Cleveland, OH, USA, Aug. 5-8, 2003.
Sato et al., "Video OCR: Indexing digital news libraries by recognition of superimposed captions", Multimedia Systems, 7:385-394, 1999.
Trier et al.m "Feature extraction methods for character recognition-A survey", Pattern Recognition, vol. 29, pp. 641-662, 1996.
Tse et al., "Global Zoom/Pan estimation and compensation for video compression" Proceedings of ICASSP 1991, pp. 2725-2728.
Zhong et al., "Structure analysis of sports video using domain models", IEEE International Conference on Multimedia and Expo., Aug. 22-25, 2001, Tokyo, Japan.
Akutsu et al., "Video indexing using motion vectors", SPIE Visual communications and Image Processing 1992, vol. 1818, pp. 1522-1530.
Arman et al., "Image processing on compressed data for large video databases", Proceedings of ACM Multimedia '93, Jun. 1993, pp. 267-272.
Smoliar et al., "Content-Based video indexing and Retrieval", IEEE Mulitmedia, Summer 1994, pp. 62-72.
Sawhney et al., "Model-Based 2D & 3D Dominant Motion Estimation of Mosaicking and Video Representation" Proc. Fifth Int'l Conf. Computer Vision, Los Alamitos, CA, 1995, pp. 583-590.
Yeung et al., "Video Browsing using clustering and scene transitions on compressed sequences" IS & T/SPIE Symposium Proceedings, Feb. 1995, vol. 2417, pp. 399-413.
Meng et al., "Scene change detection in a MPEG Compressed video Sequence" IS&T/SPIE Symposium proceedings, vol. 2419, Feb. 1995.
Zhong et al., "Clustering methods for video browsing and annotation" sotrage and retrieval for Still Image and Video Databases IV, IS&T/SPIE's electronic Images: science & Tech. 96, vol. 2670 (1996).
Shahraray, B. "Scene Change Detecton and Content-Based sampling of video Sequences" SPIE conf. Digital Image Compression: Algorithms and Technologies 1995, vol. 2419.
Leung et al., "Picture Retrieval by Content description", Journal of Information Science; No. 18, pp. 111-119, 1992.
Meng et al., "Tools for Compressed-Domain Video Indexing and Editing", SPIE conference on storage and retrieval for Image and video Database, vol. 2670 (1996).
Li et al., "Modeling of moving objects in a video database", Proceeding of IEEE International Conference on Multimedia Computing and systems, pp. 336-343; Jun. 1997.
Li et al., "Modeling video temporal relationships in an object database management system", IS&T/SPIE international Symposium on Electronic Imaging: Multimedia Computing and Networking, pp. 80-91, Feb. 1997.
Oria et al., "Modeling images for content-based queried: the DISIMA Approach", Second international Conference on Visual Information Systems, pp. 339-346: Jun. 1997.
Lin et al., "A Robust image authentication Method surviving JPEG lossy compression"; SPIE 1998; pp. 28-30.
Lin et al., "A Robust image authentication Method distinguishin JPEG compression form malicious manipulation"; CU/CRT Technical Report 486-97-119, Dec. 1997; pp. 1-43.
Walton, Steven, "Image authentication for a slippery new age, knowing when images have been changed", Dr. Dobb's 1995.

(56) References Cited

OTHER PUBLICATIONS

Schneider et al., "A Robust content based digital sugnature for image authentication", Columbia University, Image and Advanced Television Laboratory, NY; 1996; pp. 227-230.
Li et al., "Issues and solutions for authenticating MPEG video", Columbia University, Department of Electrical Engineering, NY, Jan. 1999; pp. 54-65.
Kliot et al., "Invariant-Based shape retrieval in pictorial databases", Computer Vision and Image Understanding; Aug. 1998; 71(2): 182-197.
Schmid et al., "Local grayvalue invariants for image retrieval" IEEE Transaction on Pattern Analysis and Machine Intelligence; May 1997; 19(5): 530-535.v.
Cox et al., "Secure spread spectrum watermaking for multimedia", NEC Research Institute, Technical Report 95-10, Dec. 4, 1995; pp. 1 of 1 and 1-33.
Jacobs et al., "Fast Multiresolution Image Querying," Proc of SIG-GRAPH, Los Angeles (Aug. 1995) pp. 277-286.
Kato et al., "Sketch Retrieval Method for Full Color Image Database—Query by Visual Example," Electro Technical Laboratory, MIDI, Tsukuba 305, Japan, IEEE (1992) pp. 530-532.
Netravali et al., Digital Pictures: Representation, Compression, and Standards, 2d. Ed., Plenum Press, New York and London (1995) pp. 340-344.
Del Bimbo et al., "Visual Image Retrieval by Elastic Matching of User Sketches," 19 IEEE Trans. on PAMI (1997) pp. 121-123.
Tong et al., "RUBRIC—An Environment for Full Text Information Retrieval," ACM, Jun. 1985, pp. 243-251.
Hjelsvold et al., "Searching and Browsing a Shared Video Database," IEEE, Aug. 1995, pp. 90-98.
Chabane Djeraba and Marinette Bouet "Digital Information Retrieval," Copyright 1997 ACM 0-89791-970-x/97/11 pp. 185-192.
Gong et al. (1995) "Automatic Parsing of TV Soccer Programs," IEEE, pp. 167-174.
John R. Smith (1999) "Digital Video Libraries and the Internet," IEEE, pp. 92-97.
Tonomura et al. (1990) "Content Oriented Visual Interface Using Video Icons for Visual Database Systems," Journal of Visual Languages and Computing, pp. 183-198.
Gunsel et al. (1998) "Temporal Video Segmentation Using Unsupervised Clustering and Semantic Object Tracking," Journal of Electronic Imaging 7(3), pp. 592-604.
Yoshinobu Tonomura (1991) "Video Handling Based on Structured Information for Hypermedia Systems," Proceedings of the International Conference on Multimedia Information Systems, pp. 333-344.
AMOS: An Active System for MPEG-4 Video Object Segmentation, Di Zhong and Shih-Chang, 647-651, o-8186-8821-1/98 (c) 1998 IEEE.
Gong Y. et al. A Generic Video Parsing System with a Scene Description Language (SDL). Real-Time Imaging, Feb. 1996, vol. 2, No. 1, pp. 45-49.
Russ, John C. The Image Processing Handbook. Boca Raton, Florida: CRC Press. 1995, 2nd ed., pp. 361-376.
Chang, S.-F. et al. VideoQ: An Automated Content-Based Video Search System Using Visual Cues. Proceedings ACM Multimedia 97, Seattle, WA, Nov. 9-13, 1997, pp. 313-324.
Chang, S.-F. Content-Based Indexing and Retrieval of Visual Information. IEEE Signal Processing Magazine. Jul. 1997, vol. 14, No. 4, pp. 45-48.
Li, W. et al. Vision: A Digital Video Library, Proceedings of the 1st ACM International Conference on Digital Libraries, Bethesda, MD, Mar. 20-23, 1996, pp. 19-27.
International Search Report PCT/US09/047492, Aug. 27, 2009.
International Search Report PCT/US09/40029, May 29, 2009.
International Search Report PCT/US99/26125, Apr. 3, 2000.
International Search Report PCT/US02/39247, Dec. 12, 2003.
International Search Report PCT/US00/34803, Oct. 29, 2001.
International Search Report PCT/US99/26126, May 10, 2000.
International Search Report PCT/US02/16599, Nov. 22, 2002.
International Search Report PCT/US02/31488, Feb. 4, 2003.
International Search Report PCT/US99/26127, Apr. 6, 2000.
International Search Report PCT/US10/023494, Apr. 1, 2000.
International Search Report PCT/US99/04776, May 14, 1999.
International Search Report PCT/US04/28722, Jun. 1, 2005.
International Search Report PCT/US06/007862, Mar. 29, 2007.
International Search Report PCT/US00/02488, May 25, 2000.
International Search Report PCT/US00/018231, Oct. 4, 2000.
International Search Report PCT/US09/069237, Mar. 1, 2010.
International Search Report PCT/US99/022790, Feb. 24, 1999.
International Search Report PCT/US99/22264, Feb. 11, 2000.
International Search Report PCT/US01/22485, May 11, 2003.
International Search Report PCT/US98/09124, Oct. 8, 1998.
International Search Report PCT/US03/12858, Nov. 25, 2003.
Geiger et al., "Dynamic Programming for Detecting, Tracking, and Matching Deformable Contours" IEEE Transactions on Pattern Analysis and Machine Intelligence, 17(3): 294-302, Mar. 1, 1995, XP000498121 *Abstract*.
M. Schaar, H. Radha, Adaptive motion-compensation fine- granular-scalability (AMC-FGS) for wireless video, IEEE Trans. on CSVT, vol. 12, No. 6, 360-371, 2002.
A. M. Tourapis. "Enhanced Predictive Zonal Search for Single and Multiple Frame Motion Estimation," Proceedings of Visual Communications and Image Processing 2002 (VCIP-2002), San Jose, CA, Jan. 2002, pp. 1069-1079.
H.-Y. Cheong, A. M. Tourapis, "Fast Motion Estimation within the H.264 codec," in proceedings of ICME-2003, Baltimore, MD, Jul. 6-9, 2003.
B. Girod, A. Aaron, S. Rane and D. Rebollo-Monedero , "Distributed video coding," *Proc. of the IEEE*, Special Issue on Video Coding and Delivery, 2005; pp. 1-12.
Z. He, Y. Liang, L. Chen, I. Ahmad, and D. Wu, "Power-Rate-Distortion Analysis for Wireless Video Communication under Energy Constraints," IEEE Transactions on Circuits and Systems for Video Technology, Special Issue on Integrated Multimedia Platforms, 2004.
K. Lengwehasatit and A. Ortega, "Rate Complexity Distortion Optimization for Quadtree-Based DCT Coding ",ICIP 2000, Vancouver,BC, Canada, Sep. 2000.
A. Ray and H. Radha, "Complexity-Distortion Analysis of H.264/JVT Decoder on Mobile Devices," Picture Coding Symposium (PCS), Dec. 2004.
H. Kim and Y. Altunbasak, "Low-complexity macroblock mode selection for the H.264/AVC encoders," IEEE Int. Conf. on Image Processing, Suntec City, Singapore, Oct. 2004.
X. Lu, E. Erkip, Y. Wang and D. Goodman, "Power efficient multimedia communication over wireless channels", IEEE Journal on Selected Areas on Communications, Special Issue on Recent Advances in Wireless Multimedia, vol. 21, No. 10, pp. 1738-1751, Dec. 2003.
Q. Zhang, W. Zhu, Zu Ji, and Y. Zhang, "A Power-Optimized Joint Source Channel Coding for Scalable Video Streaming over Wireless Channel", IEEE International Symposium on Circuits and Systems (ISCAS) 2001, May, 2001, Sydney, Australia.
Y. Eisenberg, C. E. Luna, T. N. Pappas, R. Berry, A.K. Katsaggelos, Joint source coding and transmission power management for energy efficient wireless video communications, CirSysVideo(12), No. 6, Jun. 2002, pp. 411-424.
National's PowerWise™ technology. http://www.national.com/appinfo/power/powerwise.html, Nov. 11, 2002.
X. Zhou, E. Li, and Y.-K. Chen, "Implementation of H.264 Decoder on General-Purpose Processors with Media Instructions", in Proc. of SPIE Visual Communications and Image Processing, Jan. 2003.
T.-C. Chen, Y.-C. Huang and L.-G. Chen, "Full Utilized and Resuable Architecture for Fractional Motion Estimation of H.264/AVC", ICASSP2004, Montreal, Canada, May 17-21, 2004.
T. Chiang and Y.-Q. Zhang, "A New Rate Control Scheme Using Quadratic Rate Distortion Model," IEEE Trans. Circuits Syst. Video Technol., vol. 7, pp. 246-250, Feb. 1997.
G. J. Sullivan and T. Wiegand, Rate-Distortion Optimization for Video Compression IEEE Signal Processing Magazine, vol. 15, No. 6, pp. 74-90, Nov. 1998.

(56) References Cited

OTHER PUBLICATIONS

A. M. Tourapis, F. Wu, S. Li, "Direct mode coding for bi-predictive pictures in the JVT standard", ISCAS2003, vol. 2, 700-703, Thailand, 2003.

V. Lappalainen, A. Hallapuro, and T.D. Hämäläinen, "Complexity of Optimized H.26L Video Decoder Implementation," IEEE Trans. Circuits Syst. Video Technol., vol. 13, pp. 717-725. Jul. 2003.

T. Wedi; H.G. Musmann, Motion- and aliasing-compensated prediction for hybrid video codingPage(s): IEEE Trans. Circuits Syst. Video Technol., vol. 13, pp. 577-586. Jul. 2003.

T. Wiegand, G. J. Sullivan, G. Bjontegaard, A. Luthra, "Overview of the H.264/AVC Video Coding Standard," IEEE Trans. Circuits Syst. Video Technol., vol. 13, pp. 560-576. Jul. 2003.

Wang, et al. "Dynamic rate scaling of coded digital video for IVOD applications." Transactions on Consumer Electronics, vol. 44(3), Aug. 1998, pp. 743-749.

Wee, et al., "Field-to-frame transcoding with spatial and temporal downsampling." Proceedings of the 1999 International Conference on Image Processing, vol. 4, Oct. 1999.

Wee, et al., "Secure scalable streaming enabling transcoding without decryption." Proceedings of the 2001 International Conference on Image Processing, vol. 1 of 3, Oct. 2001.

Wee, et al., "Secure scalable video streaming for wireless networks." Proceedings of the 2001 IEEE International Conference on Acoustics, Speech, and Signal Process, vol. 4 of 6, May 2001, pp. 2049-2052.

Sorial, et al., "Selective requantization for transcoding of MPEG compressed video." Proceedings of the 2000 IEEE International Conference on Multimrdia and Expo, vol. 1, 2000, pp. 217-220.

Kim, et al., "Description of Utility function based on optimum transcoding" ISO/IEC JTC1/SC/ WG11 MPEG02/M8319, Apr. 2002.

Mukherjee, et al., "Structured scalable meta-formsats (SSM) for digital item adaptation" Proceedings of the SPIE, SPIE, Bellingham, VA, US, vol. 5018, Jan. 2003, pp. 148-167.

Friedman, G.L., "The Trustworthy Digital Camera: Restoring Credibility to the Photographic Image", IEEE Transactions on Consumer Electronics, 39(4): 905-910; Nov. 1, 1993, XP000423080.

Lee et al., A Watermarking Sequence Using Parities of Error Control Coding for Image Authentication and Correction, IEEE Transactions on Consumer electronics, 46(2): 313-317, May 2000, XP00110026.

Tuong Dao, IEEE Proceedings, ISBN: 0-8186-8464-X; pp. 88-97, especially pp. 88-90.

Sajda et al., "In a blink of an eye and a switch of a transistor: Cortically-cuopled computer vision", Journal of Latex Class Files, Jan. 2007, 6(1): 1-14.

Wang et al., "Columbia TAG System—Transductive Annotation by Graph Version 1.0", Columbia University ADVENT Technical Report #225-2008-3, Oct. 15, 2008, entire document.

\* cited by examiner

RAPID IMAGE ANNOTATION VIA BRAIN STATE DECODING AND VISUAL PATTERN MINING

CROSS-REFERENCE TO RELATED APPLICATIONS

The present application is a continuation-in-part of International Application No. PCT/US09/69237 filed on Dec. 22, 2009, which claims priority to U.S. Provisional Application No. 61/233,325, filed on Aug. 12, 2009, U.S. Provisional Application No. 61/171,789, filed on Apr. 22, 2009, U.S. Provisional Application No. 61/151,124, filed on Feb. 9, 2009, U.S. Provisional Application No. 61/142,488, filed on Jan. 5, 2009, and U.S. Provisional Application No. 61/140,035, filed on Dec. 22, 2008, which are incorporated herein by reference in their entirety.

GRANT INFORMATION

This invention was made with government support under Grant No. NBCHC080029 awarded by DARPA. The government has certain rights in the invention.

BACKGROUND

As the volume of digital multimedia collections grow, techniques for efficient and accurate labeling, searching and retrieval of data from those collections have become increasingly important. As a result, tools such as multimedia labeling and classification systems and methods that allow users to accurately and efficiently categorize and sort such data have also become increasingly important. Unfortunately, previous labeling and classification methods and systems tend to suffer deficiencies in several respects, as they can be inaccurate, inefficient and/or incomplete, and are, accordingly, not sufficiently effective to address the issues associated with voluminous collections of multimedia.

Various methods have been used to improve the labeling of multimedia data. For example, there has been work exploring the use of user feedback to improve the image retrieval experience. In some systems, relevance feedback provided by the user is used to indicate which images in the returned results are relevant or irrelevant to the users' search target. Such feedback can be indicated explicitly (by marking labels of relevance or irrelevance) or implicitly (by tracking specific images viewed by the user). Given such feedback information, the initial query can be modified. Alternatively, the underlying features and distance metrics used in representing and matching images can be refined using the relevance feedback information. Ultimately, though, the manual labeling by humans of multimedia data, such as images and video, can be time consuming and inefficient, particularly when applied to large data libraries. Some solutions to the problems described above are disclosed in PCT Patent Application No. PCT/US09/069,237, filed on Dec. 22, 2009, the entirety of which is incorporated herein by reference.

The human brain is an exceptionally powerful visual information processing system. Humans can recognize objects at a glance, under varying poses, illuminations and scales, and are able to rapidly learn and recognize new configurations of objects and exploit relevant context even in highly cluttered scenes. While human visual systems can recognize a wide range of targets under challenging conditions, they generally have limited throughput. Human visual information processing happens with neurons which are extremely slow relative to state-of-the-art digital electronics—i.e. the frequency of a neuron's firing is measured in Hertz whereas modern digital computers have transistors which switch at Gigahertz speeds. Though there is some debate on whether the fundamental processing unit in the nervous system is the neuron or whether ensembles of neurons constitute the fundamental unit of processing, it is nonetheless widely believed that the human visual system is bestowed with its robust and general purpose processing capabilities not from the speed of its individual processing elements but from its massively parallel architecture.

Computer vision systems present their own unique benefits and potential issues. While computer vision systems can process images at a high speed, they often suffer from inadequate recognition accuracy for general target classes. Since the early 1960's there have been substantial efforts directed at creating computer vision systems which possess the same information processing capabilities as the human visual system. These efforts have yielded some successes, though mostly for highly constrained problems. One of the challenges in prior research has been in developing a machine capable of general purpose vision and mimicking human vision. Specifically, an important property of the human visual system is its ability to learn and exploit invariances.

SUMMARY

Both human and computer vision systems offer their own unique benefits and disadvantages. The presently disclosed subject matter combines the benefits of brain state decoding and visual content analysis to improve multimedia data processing efficiency.

Certain embodiments of the disclosed subject matter use brain signals measured by electroecephalopgraphy ("EEG") to detect and classify generic objects of interest in multimedia data.

Certain embodiments of the disclosed subject matter are designed to facilitate rapid retrieval and exploration of image and video collections. The disclosed subject matter incorporates graph-based label propagation methods and intuitive graphic user interfaces ("GUIs") that allow users to quickly browse and annotate a small set of multimedia data, and then in real or near-real time provide refined labels for all remaining unlabeled data in the collection. Using such refined labels, additional positive results matching a user's interest can be identified. Such a system can be used, e.g., as a bootstrapping system for developing additional target recognition tools needed in critical image application domains such as in intelligence, surveillance, consumer applications, biomedical applications, and in Internet applications.

Starting with a small number of labels, certain disclosed systems and methods can be implemented to propagate the initial labels to the remaining data and predict the most likely labels (or scores) for each data point on the graph. The propagation process is optimized with respect to several criteria. For example, the system can be implemented to consider factors such as: how well the predictions fit the already-known labels; the regularity of the predictions over data in the graph; the balance of labels from different classes; if the results are sensitive to quality of the initial labels and specific ways the labeled data are selected.

The processes providing the initial labels to label propagation systems can come from various sources, such as other classifiers using different modalities (for example, text, visual, or metadata), models (for example, supervised computer vision models or a brain computer interface), rank information regarding the data from other search engines, or even other manual annotation tools. In some systems and methods, when dealing with labels/scores from imperfect sources (e.g., search engines), additional processes can be implemented to filter the initial labels and assess their reliability before using them as inputs for the propagation process.

Certain embodiments of the disclosed subject matter use the output of the brain signal analysis as an input to a label propagation system which propagates the initial brain-signal based labels to the remaining data and predict the most likely labels (or scores) for each data point on the graph or novel data not included in the graph.

The output of certain disclosed system embodiments can include refined or predicted labels (or scores indicating likelihood of positive detection) of some or all the images in the collection. These outputs can be used to identify additional positive samples matching targets of interest, which in turn can be used for a variety of functions, such as to train more robust classifiers, arrange the best presentation order for image browsing, or rearrange image presentations.

Certain embodiments of the disclosed subject matter use a refined or predicted label set to modify the initial set of data to be presented to a user in a brain signal based target detection system.

In a disclosed embodiment of a system and method in accordance with the disclosed subject matter, a partially labeled multimedia data set is received and an iterative graph-based optimization method is employed resulting in improved label propagation results and an updated data set with refined labels.

Embodiments of the disclosed systems and methods are able to handle label sets of unbalanced class size and weigh labeled samples based on their degrees of connectivity or other importance measures.

In certain embodiments of the disclosed methods and systems, after the propagation process is completed, the predicted labels of all the nodes of the graph can be used to determine the best order of presenting the results to the user. For example, the images can be ranked in the database in a descending order of likelihood so that user can quickly find additional relevant images. Alternatively, the most informative samples can be displayed to the user to obtain the user's feedback, so that the feedback and labels can be collected for those critical samples. These functions can be useful to maximize the utility of the user interaction so that the best prediction model and classification results can be obtained with the least amount of manual user input.

The graph propagation process can also be applied to predict labels for new data that is not yet included in the graph. Such processes can be based, for example, on nearest neighbor voting or some form of extrapolation from an existing graph to external nodes.

In some embodiments of the disclosed subject matter, to implement an interactive and real-time system and method, the graph based label propagation can use a graph superposition method to incrementally update the label propagation results, without needing to repeat computations associated with previously labeled samples.

BRIEF DESCRIPTION OF THE DRAWINGS

Further features and advantages of the presently disclosed subject matter will become apparent from the following detailed description taken in conjunction with the accompanying figures showing illustrative embodiments of the disclosed subject matter, in which.

DETAILED DESCRIPTION

Systems and methods as disclosed herein can be used to overcome the labeling and classification deficiencies of prior systems and methods described above by coupling both computer vision and human vision components in various configurations. Computer vision components will first be described in accordance with the present disclosure.

Figure 1:
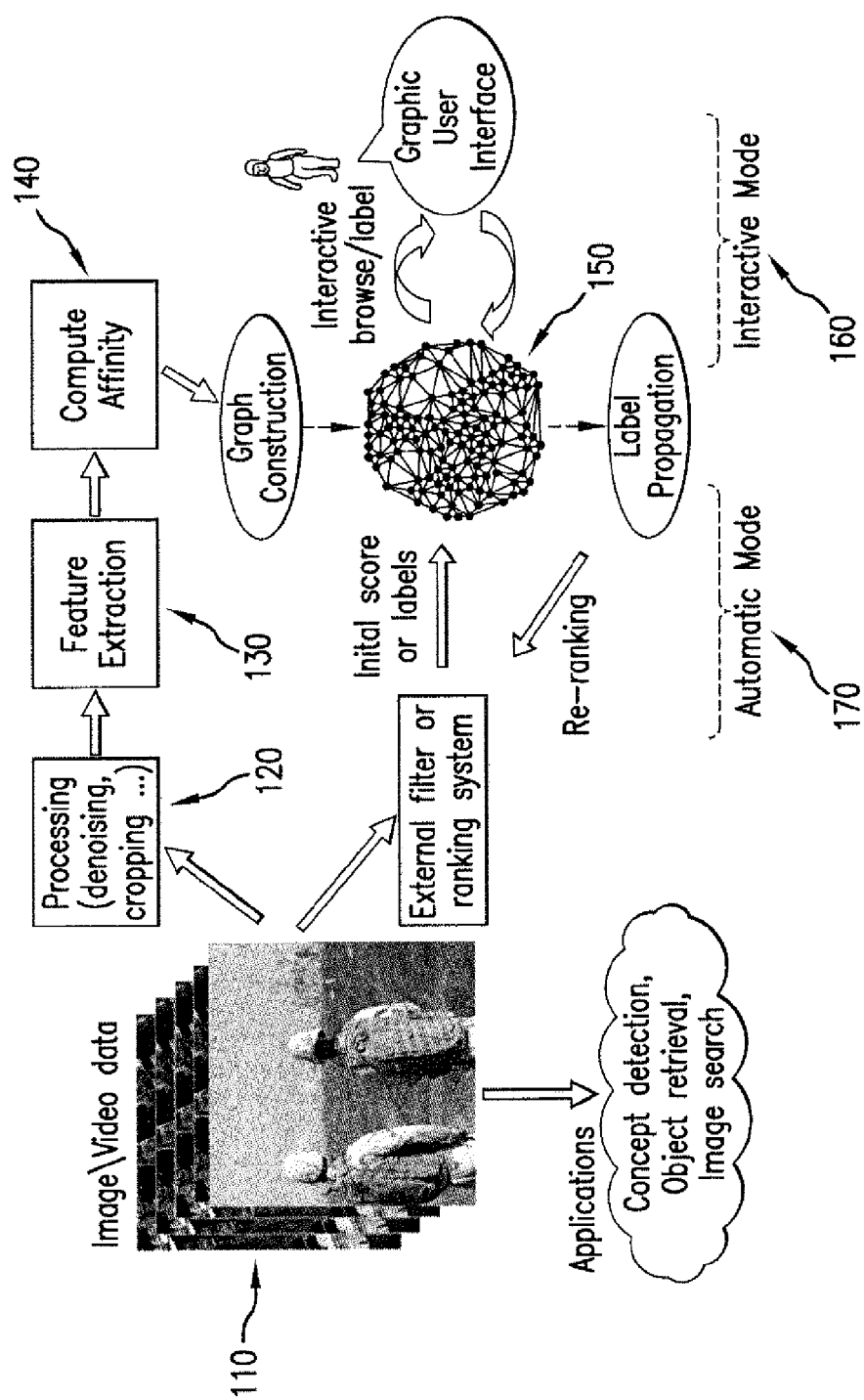
FIG. 1 is a diagram illustrating exemplary aspects of computer vision system modes in accordance with the presently disclosed subject matter.

FIG. 1 illustrates a system and various exemplary usage modes in accordance with the presently disclosed subject matter.

Given a collection of multimedia files, the exemplary computer vision components of FIG. 1 can be used to build an affinity graph to capture the relationship among individual images, video, or other multimedia data. One exemplary computer vision system can be a transductive annotation by graph (TAG) data processing system. The affinity between multimedia files can be represented graphically in various ways, for example: a continuous valued similarity measurement or logic associations (e.g., relevance or irrelevance) to a query target, or other constraints (e.g., images taken at the same location). The graph can also be used to propagate information from labeled data to unlabeled data in the same collection.

As illustrated in FIG. 1, each node in the graph 150 can represent a basic entity (data sample) for retrieval and annotation. In certain embodiments, nodes in the graph 150 can be associated with either a binary label (e.g., positive vs. negative) or a continuous-valued score approximating the likelihood of detecting a given target. The represented entity can be, for example, an image, a video clip, a multimedia document, or an object contained in an image or video. In an ingestion process, each data sample can first be pre-processed 120 (e.g., using operations such as scaling, partitioning, noise reduction, smoothing, quality enhancement, and other operations as are known in the art). Pre-filters can also be used to filter likely candidates of interest (e.g., images that are likely to contain targets of interest). After pre-processing and filtering, features can be extracted from each sample 130. TAG systems and methods in accordance with the disclosed subject matter do not necessarily require usage of any specific features. A variety of feature sets preferred by practical applications can be used. For example, feature sets can be global (e.g., color, texture, edge), local (e.g., local interest points), temporal (e.g. motion), and/or spatial (e.g., layout). Also, multiple types and modalities of features can be aggregated or combined. Given the extracted features, affinity (or similarity) between each pair of samples is computed 140. No specific metrics are required by TAG, though judicious choices of features and similarity metrics can significantly impact the quality of the final label prediction results. The pair-wise affinity values can then be assigned and used as weights of the corresponding edges in the graph 150. Weak edges with small weights can be pruned to reduce the complexity of the affinity graph 150. Alternatively, a fixed number of edges can be set for each node by finding a fixed number of nearest neighbors for each node.

Once the affinity graph 150 is created, a TAG system can be used for retrieval and annotation. A variety of modes and usages could be implemented in accordance with the teachings herein. Two possible modes include: interactive 160 and automatic 170 modes. In the Interactive Mode 160, users can browse, view, inspect, and label images or videos using a graphic user interface (GUI), an embodiment of which is described in more detail hereinafter in connection with FIG. 2. Initially, before any label is assigned, a subset of default data can be displayed in the browsing window of the GUI based on, for example, certain metadata (e.g., time, ID, etc.) or a random sampling of the data collection. Using the GUI, a user can view an image of interest and then provide feedback about relevance of the result (e.g., marking the image as "relevant" or "irrelevant" or with multi-grade relevance labels). Such feedback can then be used to encode labels which are assigned to the corresponding nodes in the graph.

In Automatic Mode 170, the initial labels of a subset of nodes in the graph can be provided by external filters, classifiers, or ranking systems. For example, for a given target, an external classifier using image features and computer vision classification models can be used to predict whether the target is present in an image and assign the image to the most likely class (positive vs. negative or one of multiple classes). As another example, if the target of interest is a product image search for web-based images, external web image search engines can be used to retrieve most likely image results using a keyword search. The rank information of each returned image can then be used to estimate the likelihood of detecting the target in the image and approximate the class scores which can be assigned to the corresponding node in the graph. An initial label set can also be generated based on the initial output of the human vision components of FIG. 1.

In this particular embodiment, the TAG system hardware configuration can include an audio-visual (AV) terminal, which can be used to form, present or display audio-visual content. Such terminals can include (but are not limited to) end-user terminals equipped with a monitor screen and speakers, as well as server and mainframe computer facilities in which audio-visual information is processed. In such an AV terminal, desired functionality can be achieved using any combination of hardware, firmware or software, as would be understood by one of ordinary skill in the art. The system can also include input circuitry for receiving information to be processed. Information to be processed can be furnished to the terminal from a remote information source via a telecommunications channel, or it can be retrieved from a local archive, for example. The system further can include processor circuitry capable of processing the multimedia and related data and performing computational algorithms. The processor circuitry may be a microprocessor, such as those manufactured by Intel, or any other processing unit capable of performing the processing described herein. Additionally, the disclosed system can include computer memory comprising RAM, ROM, hard disk, cache memory, buffer memory, tape drive, or any other computer memory media capable of storing electronic data. Notably, the memory chosen in connection with an implementation of the claimed subject matter can be a single memory or multiple memories, and can be comprised of a single computer-readable medium or multiple different computer-readable media, as would be understood by one of ordinary skill in the art.

Figure 2:
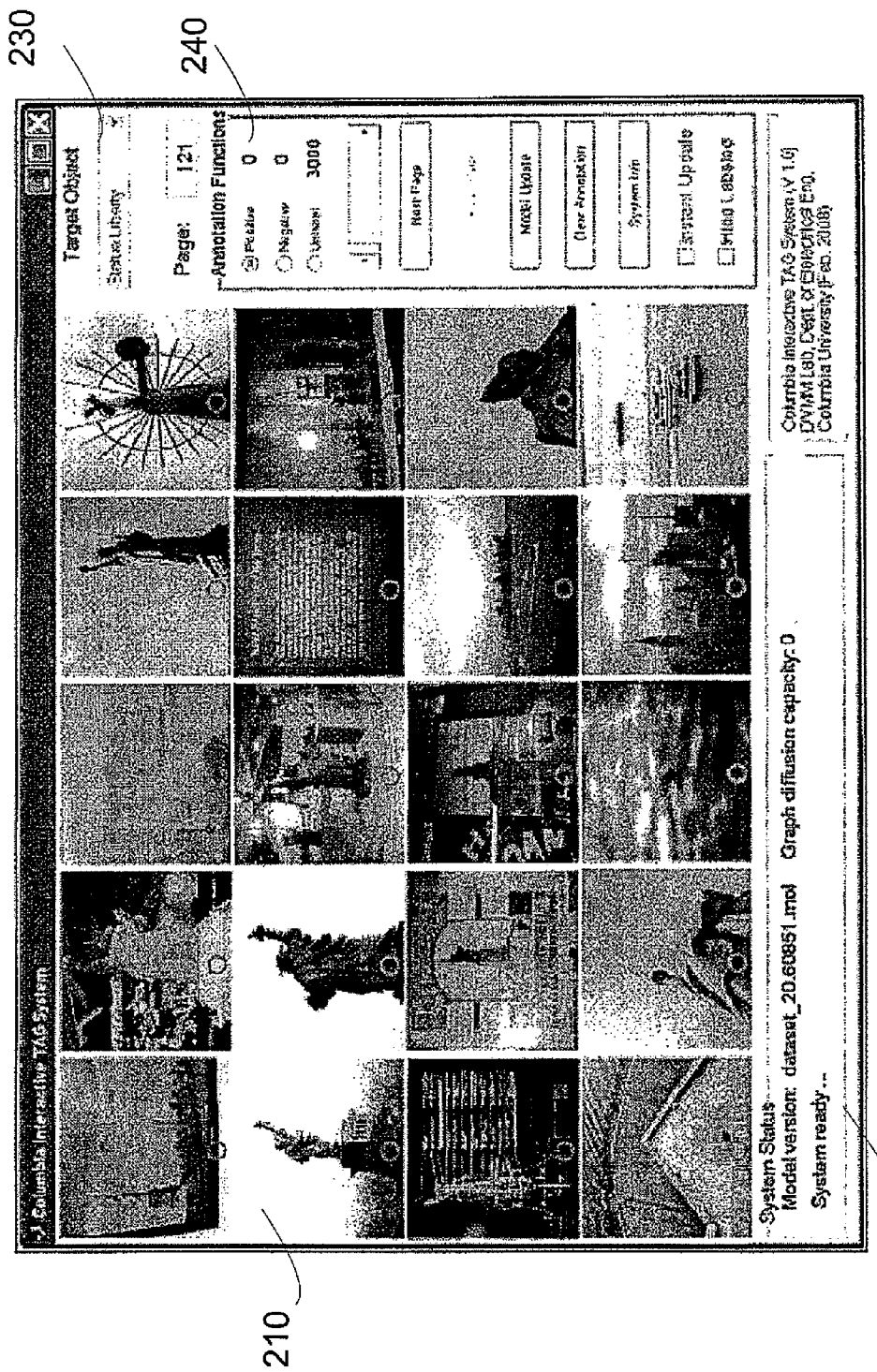
FIG. 2 is diagram illustrating an exemplary graphic user interface (GUI) portion of a computer vision module in accordance with the presently disclosed subject matter.
Figure 3:
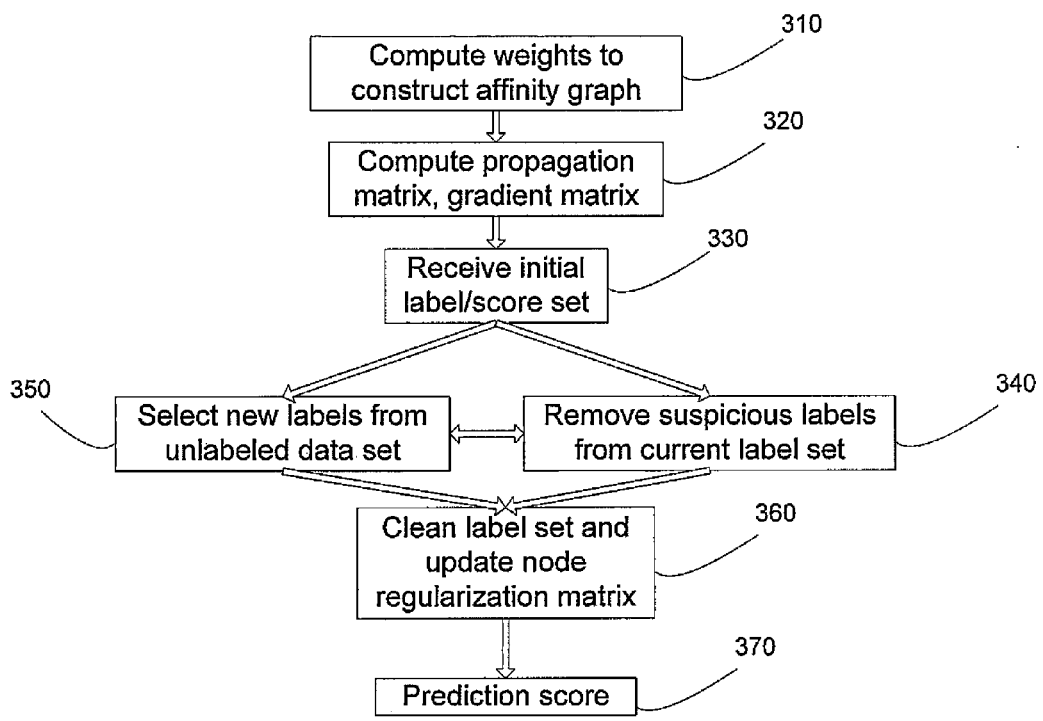
FIG. 3 is a flow chart illustrating an exemplary computer vision labeling propagation and refining method in accordance with the presently disclosed subject matter.

FIG. 2 shows an exemplary system GUI that can optionally be implemented in accordance with the presently disclosed subject matter. The disclosed GUI can include a variety of components. For example, image browsing area 210, as shown in the upper left corner of the GUI, can be provided to allow users to browse and label images and provide feedback about displayed images. During the incremental annotation procedure, the image browsing area can present the top ranked images from left to right and from top to bottom, or in any other fashion as would be advantageous depending on the particulars of the application. System status bar 220 can be used to display information about the prediction model used, the status of current propagation process and other helpful information. The system processing status as illustrated in FIG. 2 can provide system status descriptions such as, for example, 'Ready', 'Updating' or 'Re-ranking.' The top right area 230 of the GUI can be implemented to indicate the name of current target class, e.g., "statue of liberty" as shown in FIG. 3. For semantic targets that do not have prior definition, this field can be left blank or can be populated with general default text such as "target of interest." Annotation function area 240 can be provided below the target name area 230. In this embodiment, a user can choose from labels such as 'Positive', 'Negative', and 'Unlabeled.' Also, statistical information, such as the number of positive, negative and unlabeled samples can be shown. The function button in this embodiment includes labels 'Next Page', 'Previous Page', 'Model Update', 'Clear Annotation', and 'System Info.'

Various additional components and functions can be implemented. For example, image browsing functions can be implemented in connection with such a system and method. After reviewing the current ranking results or the initial ranking, in this embodiment, such functionality can be implemented to allow a user to browse additional images by clicking the buttons 'Next Page' and 'Previous Page.' Additionally, a user can also use the sliding bar to move through more pages at once.

Manual annotation functions can also optionally be implemented. In certain embodiments, after an annotation target is chosen, the user can annotate specific images by clicking on them. For example, in such a system, positive images can be marked with a check mark, negative images can be marked with a cross mark 'x', and unlabeled images can be marked with a circle 'o'.

Automatic propagation functions can also be implemented in connection with certain embodiments. After a user inputs some labels, clicking the button 'Model Update' can trigger the label propagation process and the system will thereafter automatically infer the labels and generate a refined ranking score for each image. A user can reset the system to its initial status by clicking the button labeled 'Clear Annotation.' A user can also click the button labeled 'System Info' to generate system information, and output the ranking results in various formats that would be useful to one of ordinary skill in the art, such as, for example, a MATLAB-compatible format.

In the GUI embodiment shown in FIG. 2, two auxiliary functions are provided which are controlled by checking boxes 'Instant Update' and 'Hide Labels.' When a user selects 'Instant Update,' the shown system will respond to each individual labeling operation and instantly update the ranking list. The user can also hide the labeled images and only show the ranking results of unlabeled images by checking 'Hide Labels.'

Given assigned labels or scores for some subset of the nodes in the graph (the subset is usually but not necessarily a small portion of the entire graph), embodiments of the disclosed systems can propagate the labels to other nodes in the graph accurately and efficiently.

FIG. 3 is a chart illustrating a TAG labeling propagation method in accordance with an exemplary implementation of the presently disclosed subject matter. At 310, the similarity or association relations between data samples are computed or acquired to construct an affinity graph. In 320, some graph quantities, including a propagation matrix and gradient coefficient matrix are computed based on the affinity graph. At 330, an initial label or score set over a subset of graph data is acquired. In various embodiments, this can be done via either interactive or automatic mode, or by some other mode implemented in connection with the disclosed subject matter. At 340, one or more new labels are selected and added to the label set. Procedure 350 is optional, where one or more unreliable labels are selected and removed from the existing label set. In 360, cleaned label set are obtained and a node regularization matrix is updated to handle the unbalanced class size problem of label data set. Procedures 340, 350, and 360 can be repeated until a certain number of iterations or some stop criteria are met. In step 370, the final classification function and prediction scores over the data samples are computed.

Additional description of computer vision algorithms and graph data generally described above is now provided. In an embodiment in accordance with the disclosed subject matter, an image set $X=(X_L, X_U)$ can include labeled samples $X_L=\{x_1, \ldots, x_l\}$ and unlabeled samples $X_U=\{x_{l+1}, \ldots, x_n\}$, where l is the number of labels. The corresponding labels for the labeled data set can be denoted as $\{y_1, \ldots, y_l\}$, where $y \in \{1, \ldots, c\}$ and c is the number of classes. For transductive learning, an objective is to infer the labels $\{y_{l+1}, \ldots, y_n\}$ of the unlabeled data $X_U=\{x_{l+1}, \ldots, x_n\}$, where typically $l \ll n$, namely only a very small portion of data are labeled. Embodiments can define an undirected graph represented by $G=\{X, E\}$, where the set of node or vertices is $X=\{x_i\}$ and the set of edges is $E=\{e_{ij}\}$. Each sample $x_i$ can be treated as the node on the graph and the weight of edge $e_{ij}$ can be represented as $w_{ij}$. Typically, one uses a kernel function $k(\cdot)$ over pairs of points to calculate weights, in other words $w_{ij}=k(x_i,x_j)$ with the RBF kernel being a popular choice. The weights for edges can be used to build a weight matrix which can be denoted by $W=\{w_{ij}\}$. Similarly, the node degree matrix $D=\text{diag}(d_1, \ldots, d_n)$ can be defined as $$d_i = \sum_{j=1}^{n} w_{ij}.$$

Figure 4:
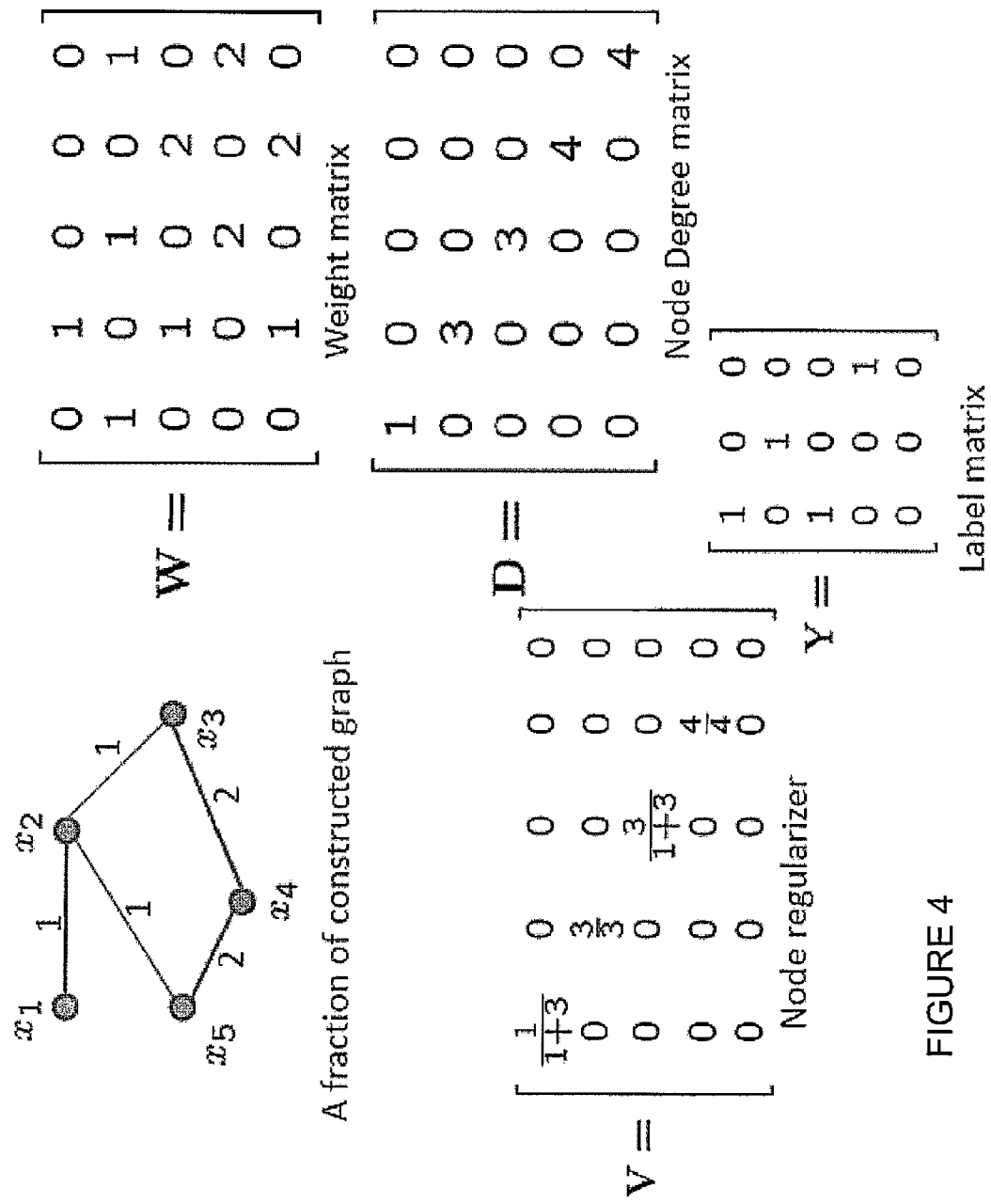
FIG. 4 is a diagram illustrating a fraction of a computer vision constructed graph and computation of a computer vision node regularizer method in accordance with the presently disclosed subject matter.

A graph related quantity $\Delta=D-W$ is called graph Laplacian and its normalized version is $$L=D^{-1/2}\Delta D^{-1/2}=I-D^{-1/2}WD^{-1/2}=I-S$$

where $S=D^{-1/2}WD^{-1/2}$. The binary label matrix Y can be described as $Y \in B^{n \times c}$ with $Y_{ij}=1$ if $x_i$ has label $y_i=j$ (means data $x_i$ belongs to class j) and $Y_{ij}=0$ otherwise (means data $x_i$ is unlabeled). A data sample can belong to multiple classes simultaneously and thus multiple elements in the same row of Y can be equal to 1. FIG. 4 shows a fraction of a representative constructed graph with weight matrix W, node degree matrix D, and label matrix Y. A classification function F, can then be estimated on the graph to minimize a cost function. The cost function typically enforces a tradeoff between the smoothness of the function over the graph and the accuracy of the function at fitting the label information for the labeled nodes.

Embodiments of the disclosed TAG systems and methods can provide improved quality of label propagation results. For example, disclosed embodiments can include: superposition law based incremental label propagation; a node regularizer for balancing label imbalance and weighting label importance; alternating minimization based label propagation; and label diagnosis through self tuning.

Figure 5:
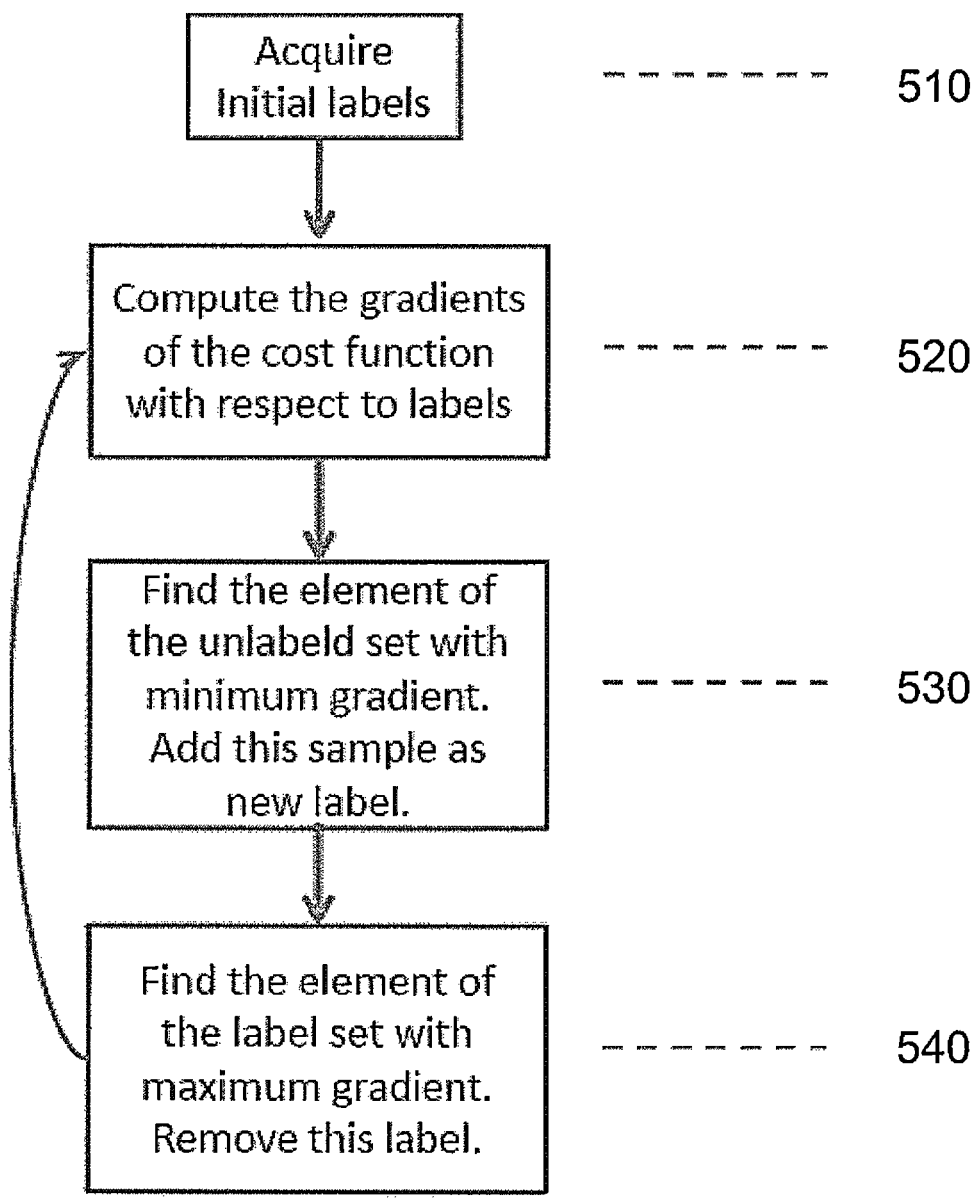
FIG. 5 is a flow chart illustrating an exemplary computer vision labeling diagnosis method in accordance with the presently disclosed subject matter.

Embodiments of the disclosed TAG systems and methods can also include an incremental learning method that allows for efficient addition of newly labeled samples. Results can be quickly updated using a superposition process without repeating the computation associated with the labeled samples already used in the previous iterations of propagation. Contributions from the new labels can be easily added to update the final prediction results. Such incremental learning capabilities can be useful for achieving real-time responses to a user's interaction. Since the optimal prediction can be decomposed into a series of parallel problems, and the prediction score for individual class can be formulated as component terms that only depend on individual columns of a classification matrix F:

$$F = (I - \alpha S)^{-1} \sum_{i=1}^{l} \hat{Y}_i = \sum_{i=1}^{l} (I - \alpha \hat{S})^{-1} Y_i = \sum_{i=1}^{l} \hat{F}_i$$

where $\alpha \in (0,1)$ is a constant parameter. Because each column of F encodes the label information of each individual class, such decomposition reveals that biases can arise if the input labels are disproportionately imbalanced. Prior propagation algorithms often failed in this unbalanced case, as the results tended to be biased towards the dominant class. To overcome this problem, embodiments disclosed herein can apply a graph regularization method to effectively address the class imbalance issue. Specifically, each class can be assigned an equal amount of weight and each member of a class can be assigned a weight (termed as node regularizer) proportional to its connection density and inversely proportional to the number of samples sharing the same class.

$$F = \sum_{i=1}^{l} v_{ii} \hat{F}_i = \sum_{i=1}^{l} (I - \alpha \hat{S})^{-1} v_{ii} Y_i = (I - \alpha S)^{-1} VY$$

where the diagonal matrix $V=\{v_{ii}\}$ is introduced as a node regularizer to balance the influence of labels from different classes. Assume sample $x_i$ is associated with label j, the value of $v_{ii}$ is computed as:

$$v_{ii} = d_i \bigg/ \sum_{k=1}^{l} d_k Y_{kj}$$

where $d_i$ is the node degree of labeled sample $x_i$ and $$\sum_{k=1}^{l} d_k Y_{kj}$$

is the sum of node degree of the labeled nodes in class j. FIG. 5 illustrates the calculation of node regularizer on a fraction of an exemplary constructed graph. The node weighting mechanism described above allows labeled nodes with a high degree to contribute more during the graph diffusion and label propagation process. However, the total diffusion of each class can be kept equal and normalized to be one. Therefore the influence of different classes can be balanced even if the given class labels are unbalanced. If class proportion information is known beforehand, it can be integrated into particular systems and methods by scaling the diffusion with the prior class proportion. Because of the nature of graph transduction and unknown class prior knowledge, however, equal class balancing leads to generally more reliable solutions than label proportional weighting.

Along with the node regularizer, incremental learning by superposition law is described here as another embodiment of the disclosed systems and methods. Let $$D_j = \sum_{k=1}^{l} d_k Y_{kj}$$

denotes the total degree of the current labels in class j. Adding a new labeled sample $x_s$ (the corresponding degree is $d_{ss}$) to class j, two coefficients $\lambda$, $\gamma$ can be calculated as:

$$\lambda = \frac{D_j}{D_j + d_{ss}} \quad \gamma = \frac{d_{ss}}{D_j + d_{ss}}$$

Then the new prediction score for class j can be rapidly computed as:

$$F_j^{new} = \lambda F_j + \gamma P_{\cdot s}$$

where $F_{\cdot j}$ is the jth column of the classification matrix F and $P_{\cdot s}$ is the jth column of the propagation matrix P (The propagation matrix will be defined later). This is in contrast to a brute force approach that uses the whole set of labeled samples, including the new labeled sample and the existing labeled samples, to calculate the classification function from scratch again. The disclosed systems and methods result in a much more efficient implementation of the label propagation process.

Certain embodiments of the disclosed systems and methods make modifications to the cost function used in previously used systems and methods. For example, in certain systems and methods, the optimization is explicitly shown over both the classification function F and the binary label matrix Y:

$$(F^*, Y^*) = \arg\min_{F \in R^{n \times c}, Y \in B^{n \times c}} Q(F, Y)$$

where B is the set of all binary matrices Y of size n×c that satisfy $\Sigma_j Y_{ij} = 1$ for a single labeling problem, and for the labeled data $x_i \in X_l$, $Y_{ij} = 1$ if $y_i = j$. However, embodiments of the disclosed systems and methods naturally adapt to a multiple-label problem, where single multimedia file can be associated with multiple semantic tags. More specifically, the loss function is:

$$Q(F, Y) = \frac{1}{2} tr\{F^T L F + \mu (F - VY)^T (F - VY)\}$$

where the parameter $\mu$ balances two parts of the cost function. The node regularizer V permits the use of a normalized version of the label matrix Z defined as: Z=VY. By definition, in certain embodiments, the normalized label matrix satisfies $\Sigma_i Z_{ij} = 1$.

An alternating minimization procedure to solve the above optimization problem can also contribute to improvements over prior methods and systems, as disclosed herein. Specifically, the cost function discussed above includes two variables that can be optimized. While simultaneously recovering both solutions can be difficult due to the mixed integer programming problem over binary Y and continuous F, a greedy alternating minimization approach can be used instead. The first update of the continuous classification function F is straightforward since the resulting cost function is convex and unconstrained, which allows the optimal F to be recovered by setting the partial derivative $$\frac{\partial Q}{\partial F}$$

equal to zero. However, since $Y \in B^{n \times c}$ is a binary matrix and subject to certain linear constraints, another part of another embodiment of the disclosed alternating minimization requires solving a linearly constrained max cut problem which is NP. Due to the alternating minimization outer loop, investigating guaranteed approximation schemes to solve a constrained max cut problem for Y can be unjustified due to the solution's dependence on the dynamically varying classification function F during an alternating minimization procedure. Instead, embodiments of the currently disclosed methods and systems can use a greedy gradient-based approach to incrementally update Y while keeping the classification function F at the corresponding optimal setting. Moreover, because the node regularizer term V normalizes the labeled data, updates of V can be interleaved based on the revised Y.

The classification function, $F \in R^{n \times c}$, as used in certain embodiments of the disclosed subject matter, is continuous and its loss terms are convex, which allows its minimum to be recovered by zeroing the partial derivative:

$$\frac{\partial Q}{\partial F} = 0 \Rightarrow LF + \mu(F^* - VY) = 0$$

$$\Rightarrow F^* = (L/\mu + I)^{-1} VY = PVY$$

where $P = (L/\mu + I)^{-1}$ is denoted as the propagation matrix and can assume the graph is symmetrically built. To update Y, first Y can be replaced by its optimal value $F^*$ as shown in the equation above. Accordingly:

$$Q(Y) = \frac{1}{2} tr(Y^T V^T P^T L P V Y + \mu (PVY - VY)^t (PVY - VY))$$

$$= \frac{1}{2} tr(Y^T V^T [P^T L P + \mu (P^t - I)(P - I)] VY)$$

This optimization still involves the node regularizer V, which depends on Y and normalizes the label matrix over columns. Due to the dependence on the current estimate of F and V, only an incremental step will be taken greedily in certain disclosed embodiments to reduce Q(Y). In each iteration, position (i*, j*) in the matrix Y can be found and the binary value $Y_{i^* j^*}$ of can be changed from 0 to 1. The direction with the largest negative gradient can guide the choice of binary step on Y. Therefore, $$\frac{\partial Q}{\partial Y}$$

can be evaluated and the associated largest negative value can be found to determine (i*, j*).

Note that setting $Y_{i^*j^*}=1$ is equivalent to a similar operation on the normalized label matrix Z by setting $Z_{i^*j^*}=\epsilon 0<\epsilon<1$, and Y, Z to have one-to-one correspondence. Thus, the greedy minimization of Q with respect to Y in this disclosed embodiment is equivalent to the greedy minimization of Q with respect to Z:

$$(i^*, j^*) = \underset{i,j}{\operatorname{argmin}} \frac{\partial Q}{\partial Z}$$

The loss function can be rewritten using the variable Z as:

$$Q(Z)=\tfrac{1}{2}tr(Z^T[P^TLP+\mu(P^T-I)(P-I)]Z)=\tfrac{1}{2}tr(Z^TAZ)$$

where A represents $A=P^TLP+\mu(P^T-I)(P-I)$. Note that A is symmetric if the graph is symmetrically built. The gradient of the above loss function can be derived and recovered with respect to Z as:

$$\frac{\partial Q}{\partial Z} = AZ = AVY.$$

As described earlier, the gradient matrix can be searched to find the minimal element for updating the following equation:

$$(i^*,j^*)=arg\min_{x \in X_u, 1 \le j \le c} \nabla z_{ij} Q$$

The label matrix can be updated by setting $Y_{i^*j^*}=1$. Because of the binary nature of Y, $Y_{i^*j^*}$ can be set to equal 1 instead of using a continuous gradient approach. Accordingly, after each iteration, the node regularizer can be recalculated using the updated label matrix.

The updated Y in accordance with certain disclosed embodiments is greedy and could therefore oscillate and backtrack from predicted labeling in previous iterations without convergence guarantees. To guarantee convergence and avoid backtracking, inconsistency or unstable oscillation in the greedy propagation of labels, in preferred embodiments, once an unlabeled point has been labeled, its labeling can no longer be changed. In other words, the most recently labeled point (i*, j*) is removed from future consideration and the algorithm only searches for the minimal gradient entries corresponding to the remaining unlabeled samples. Thus, to avoid changing the labeling of previous predictions, the new labeled node $x_i$ can be removed from $X_u$ and added to $X_l$.

The following equations summarize the updating rules from step t to t+1 in certain embodiments of the scheme of graph transduction via alternative minimization (GTAM). Although the optimal F* can be computed in each iteration, it does not need to be explicitly updated. Instead, it can be implicitly used to directly updated Y:

$$\nabla_Z Q^t = A \cdot V^t Y^t$$

$$(i^*, j^*) = \operatorname{argmin}_{X_i \in X_u, 1 \le j \le c} \nabla_{Z_{ij}} Q^t$$

$$Y_{i^*j^*}^{t+1} = 1$$

$$v_{ii}^{t+1} = d_i \bigg/ \sum_{k=1}^{L} d_k Y_{kj}^{t+1}$$

$$X_L^{t+1} \leftarrow X_L^t + x_{i^*}; X_U^{t+1} \leftarrow X_U^t - x_{i^*}$$

The procedure above can repeat until all points have been labeled in connection with the label propagation of the disclosed subject matter.

To handle errors in a label set, embodiments of the disclosed methods and systems can be extended to formulate a graph transduction procedure with the ability to handle mislabeled instances. A bidirectional greedy search approach can be used to simultaneously drive wrong label correction and new label inferencing. This mechanism can allow for automatic pruning of incorrect labels and maintain a set of consistent and informative labels. Modified embodiments of the systems and methods disclosed earlier can be equipped to more effectively deal with mislabeled samples and develop new "Label Diagnosis through Self Tuning" (LDST) systems and methods. In an exemplary embodiment of these systems and methods, a set of initial labels is acquired. They can be acquired, for example, either by user annotation or from another resource, such as text-based multimedia search results. The gradient of the cost function with respect to label variable is computed based on the current label set is computed, and a label is added from said unlabeled data set based on the greedy search, i.e., finding the unlabeled sample with minimum gradient value. A label is then removed from said label set based on the greedy search, i.e., finding the labeled sample with maximum gradient value. The last two can be performed in reverse order without losing generalization, and can be executed a variable number of times (e.g., several new labels can be added after removing an existing label). Certain embodiments of the disclosed systems and methods update the computed gradients based on the new label set and repeat the last two parts of the procedure to retrieve a refined label set.

Embodiments of the disclosed LDST systems and methods can be used to improve the results of text based image search results. In one embodiment, top-ranked images can be truncated to create a set of pseudo-positive labels, while lower-ranked images can be treated as unlabeled samples. LDST systems and methods can then be applied to tune the imperfect labels and further refine the rank list. Additional embodiments can be used on a variety of data set types, including text classification on webpages and to correctly identify handwritten data samples.

The human vision components of the presently disclosed subject matter (including the brain-computer interface) are now described.

As previously mentioned, in recent years, there has been substantial interest in decoding the human brain state. There have been a variety of neural signals which have been targeted for decoding, ranging from spike trains collected via invasive recordings to hemodynamic changes measured via non-invasive fMRI. Systems and methods in accordance with the disclosed subject matter use EEG as a non-invasive measure to relate brain state to events correlated with the detection of "interesting" visual objects and images. One example of a robust signal using EEG is the P300. The P300 reflects a perceptual orienting response or shift of attention which can be driven by the content of the sensory input stream. Oscillatory brain activity often found during resting state (10 Hz oscillations known as "alpha" activity) as well as transient oscillations sometimes associated with perceptual processing (30 Hz and higher known as "gamma" activity) can also be indicative of a subject's attention state.

Certain systems and methods in accordance with the disclosed subject matter distinguish between two distinct brain states: (+) positive states in which the subject sees something of interest in an image, versus (−) negative states for which the image contains nothing of particular interest. This distinction is not to deduce from the brain signal what the exact content is or what the subject sees in the image, but instead, to utilize the high temporal resolution of EEG to detect individual recognition events from just a short segment of EEG data. For individual images that are presented to a subject for as little as 100 ms, exemplary embodiments of the disclosed systems and methods can detect the brain signals elicited by positive examples, and distinguish them from the brain activity generated by negative example images. A task for exemplary disclosed analysis systems and methods is to classify the signal between two possible alternatives.

In exemplary systems and methods in accordance with the disclosed subject matter, a fast image sequences is presented to a user via a process known as rapid serial visual presentation (RSVP). In exemplary embodiments of RSVP, images can be presented very rapidly, for example, at rates of 5 to 10 images per second. To classify brain activity elicited by these images, certain exemplary methods analyze is of data, recorded with multiple surface electrodes, following the presentation of an image.

Systems and methods in accordance with the disclosed subject matter can be used to measure linear variations in EEG measurement signals. By averaging over EEG measurements with appropriate coefficients (positive or negative with magnitudes corresponding to how discriminant each electrode is) it is possible to obtain a weighted average of the electrical potentials that can be used to differentiate positive from negative examples as represented below:

$$y_t = \sum_i w_i x_{it},$$

Here $x_{it}$ represents the electrical potential measured at time t for electrode i on the scalp surface, while $w_i$ represents the spatial weights which have to be chosen appropriately. A goal of this summation is to combine voltages linearly such that the sum y is maximally different between two conditions. This can be thought of as computing a neuronal current source $y_t$ that differs most between times samples t+ following positive examples and the times t− following negative examples, $y_{t+} > y_{t-}$. Label '+' indicates that the expression is evaluated with a signal $x_{it}$ recorded following positive examples and label '−' indicates the same for negative examples. There are a number of algorithms available to find the optimal coefficients w, in such a binary linear classification problem, e.g., Fisher Linear Discriminants (FLD), Penalized Logistic Regression (PLR), and Support Vectors Machines (SVM).

In certain methods and systems in accordance with the disclosed subject matter, optimal weight vectors, $w_{ki}$ are calculated for a time window following the presentation of the data (index k labels the time window):

$$y_{kt} = -\sum_i w_{ki} x_{it}, \, t = (k-1)T \ldots kT$$

These different current sources $y_{kt}$ can then be combined in an average over time to provide the optimal discriminant activity over the relevant time period:

$$y = \sum_t \sum_k v_k y_{tk};$$

For an efficient on-line implementation of this method, FLD can be used to train coefficients $w_{ik}$ within each window of time, i.e., $w_{ik}$ is trained such that $y_{kt+} > y_{kt-}$. The coefficients $v_k$ can be used learned using PLR after all exemplars have been observed such that $y_+ > y_-$. Because of the two-part process of first combining activity in space, and then again in time, this algorithm can be referred to as a "Hierarchical Discriminant Component Analysis"

Note that the first part in the exemplary embodiments described above does not average over time samples within each window. Instead, each time sample provides a separate exemplar that is used when training the FLD. For instance, a system with 50 training exemplars and 10 samples per window results in 500 training samples for a classification algorithm that can need to find 64 spatial weighting coefficients $w_{ik}$ for the kth window. These multiple samples within a time window will correspond to a single exemplar image and are therefore not independent. They do, however, provide valuable information on the noise-statistic: variations in the signal within the time window are assumed to reflect non-discriminant "noise." In other words, one can assume that spatial correlation in the high-frequency activity (f>1/T) is shared by the low-frequency discriminant activity. In addition, by training the spatial weight separately for each window one assume that the discriminant activity is not correlated in time beyond the time window time scale. Both these assumptions contribute to a system's ability to combine thousands of dimensions optimally despite the small number of known training images.

The method described above combines activity linearly. This is motivated by the notion that a linear combination of voltages corresponds to a current source, presumably of neuronal origin within the skull. Thus, this type of linear analysis is sometimes called source-space analysis ("beam-forming" is a common misnomer for the same). A general form of combining voltages linearly in space and time can be represented as:

$$y = \sum_t \sum_i w_{it} x_{it}$$

However, the number of free parameters $w_{it}$ in this general form is the full set of dimensions −6,400 for certain embodiments, for example—with only a handful of positive exemplars to choose their values. To limit the degrees of freedom one can restrict the matrix $w_{it}$ to be of lower rank, e.g., K. The linear summation can then be written as:

$$y = \sum_t \sum_i w_{it} x_{it},$$

where is a low-rank bilinear representation of the full parameter space.

This bilinear model assumes that discriminant current sources are static in space with their magnitude (and possibly polarity) changing in time. The model allows for K such components with their spatial distribution captured by $u_{ik}$ and their temporal trajectory integrated with weights $v_{tk}$. Again, a goal is to find coefficient $u_{ik}$, $v_{tk}$ such that the bilinear projection is larger for positive examples than for negative examples, i.e., y+>y−. Notably, the x values referenced above need not be a time-domain signal, but could also be in the frequency domain. The linear integration could be performed in either domain.

The algorithms presented so far capture a type of activity that is often referred to as event related potentials (ERP). This term, ERP, refers to activity that is evoked in a fixed temporal relationship to an external event, that is, positive and negative deflections occur at the same time relative to the event—for example, the time of image presentation. In addition to this type of evoked response activity the EEG often shows variations in the strength of oscillatory activity. Observable events can change the magnitude of ongoing oscillatory activity or can induce oscillations in the EEG. To capture the strength of an oscillation, irrespective of polarity, it is common to measure the "power," or the square of the signal, typically after it has been filtered in a specific frequency band. Instead of a linear combination, to capture power, one has to allow for a quadratic combination of the electrical potentials.

Once an interest score, y, is calculated, it can be converted to an interest label for use in a multimedia analysis/computer vision system as described above. More specifically, a binarization function $g(\cdot)$ can be applied to convert interest scores to multimedia labels as $y=g(e)$, where $yi \in \{1,0\}$ and $yi=1$ for $ei > \epsilon$, otherwise $yi=0$. The value $\epsilon$ can be referred to as an interest level for discretizing the EEG scores Using the principles of computer vision systems (such as TAG) and brain-computer interfaces (EEG-based) as set forth above, systems and methods according to the disclosed subject matter herein can be implemented.

In accordance with the disclosed subject matter, it is possible to implement computer vision followed by EEG-RSVP systems and methods described above. Given prior information of a target type which can be instantiated in a TAG-based model, including contextual cues, TAG-based processing can operate on a dataset so as to eliminate regions of very low target probability and also provide an initial ordering of regions having high target probability. In addition, TAG can center image chips of potential regions of interest (ROIs) in a large image or set of images, which improves detection since potential targets are foveated when images are presented to subject. The top M images of the reordered dataset, in which sensitivity is high but specificity can be low, can be sampled and presented to the subject for EEG-RSVP analysis. The brain-computer interface processing can be tuned to produce high sensitivity and low specificity, with the EEG-RSVP mode can be used to increase specificity while maintaining sensitivity.

Figure 6:
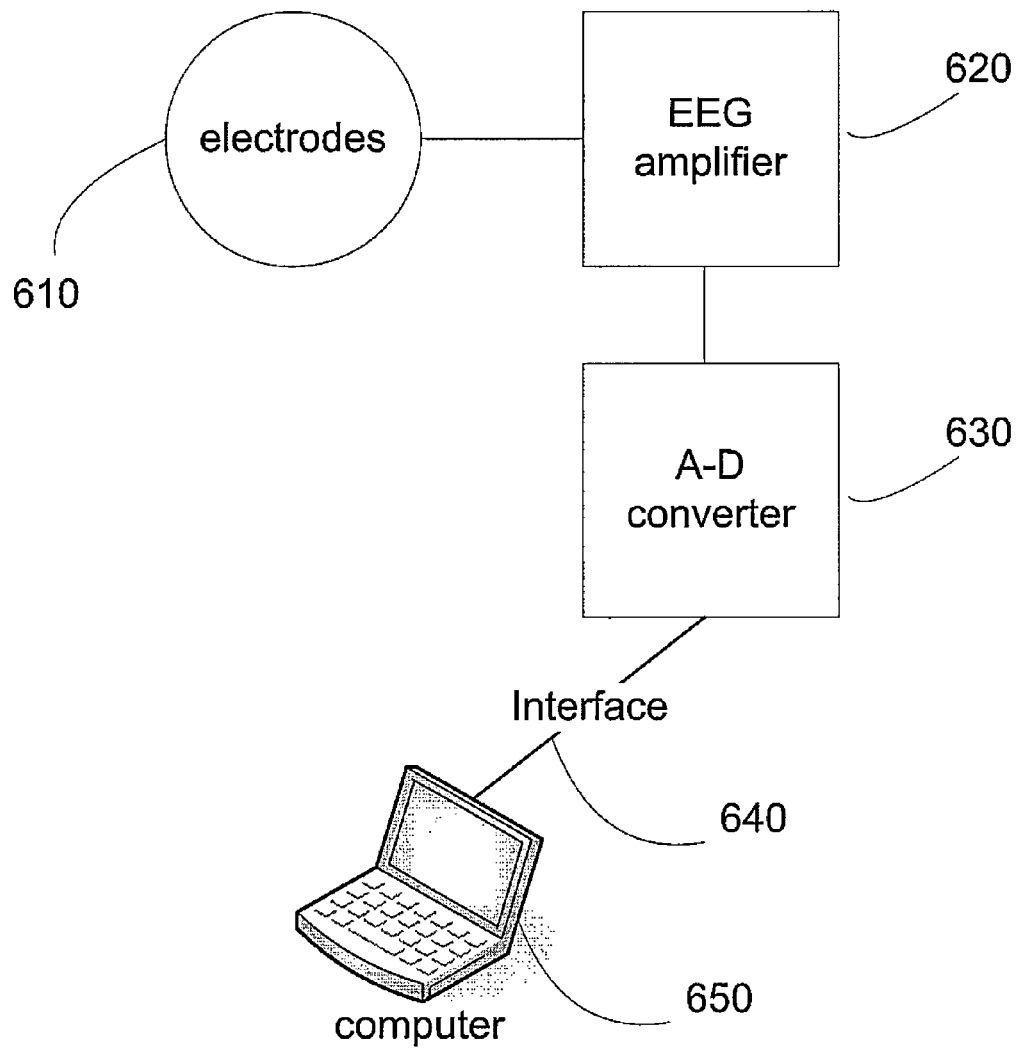
FIG. 6 illustrates hardware and functional components of an exemplary system for brain signal acquisition and processing.

FIG. 6 illustrates the hardware components of a particular embodiment of a subsystem for brain data acquisition in accordance with the disclosed subject matter. Such a subsystem can include EEG electrodes 610, which may be passive or active electrodes. The electrodes are connected to an EEG amplifier 620, which processes and amplifies the EEG signals for further analysis. An analog-to-digital converter 630 is then used to input the data received from the amplifier into a computer 650. Interface 640 between the A-D converter 630 and the computer 650 may be a wire interface connected via USB or other standard, or a wireless connection via Bluetooth or other standard, or any other known mechanism for data transfer. In certain embodiments, the system hardware implementation can use multiple computers 650, such as three personal computers (laptop, desktop, handheld, or any other personal computing device), two used for the RSVP and EEG recording and classification, and one for image processing, or the functionality of all modules could be performed from a single computer. One of ordinary skill in the art would understand a variety of different configurations of such a system, including a general purpose personal computer programmed with software sufficient to enable the methods of the disclosed subject matter described herein.

In one exemplary embodiment, the analysis system utilizes a 64 electrode EEG recording system in a standard montage. EEG can be recorded at, for example, a 1 kHz sampling rate. While the EEG is being recorded, the RSVP display module can uses a dedicated interface to display blocks of images at the specified frame rate. In certain embodiments, blocks are typically 100 images long. The frame rate can be set to 5 or 10 Hz depending on the target/imagery types, and the human observer's response to preliminary presentations. The interface draws from a pool of potential target chips and a pool of "distracters." One role of the distracters is to achieve a desired prevalence of target chips, that will maintain the human observer engaged in the presentation: if the prevalence is too low or too high, the observer can not keep an adequate focus and can more easily miss detections. Given that the computer vision outputs include some false positives, the number of distracters used depends in fact on the expected number of true target chips from the computer vision module.

The exemplary EEG analysis module can receive a list of image chips and detection details from the computer vision module, that includes pixel locations and detection confidence scores, and uses this input to generate the RSVP image sequences that will be used for presentation to the subject and analysis. It then performs several tasks: it acquires and records the EEG signals, using for example the hardware identified in FIG. 6, orchestrates the RSVP, matches the EEG recordings with the presented images, trains an underlying classifier using training sequences, and uses the classifier with new generated image sequences.

In certain embodiments, a classification module relies on a hierarchical discriminant component analysis algorithm. At the first level, the classifier can use multiple temporal linear discriminators, each trained on a different time window relative to the image onset, to estimate EEG signatures of target detection. At a second level, the classifier can estimate a set of spatial coefficients that will optimally combine the outputs of the temporal discriminators to yield the final classification outcomes. The classification module is used in two different stages: training and actual usage with new imagery. The training can include a presentation of blocks with a set number of known targets in each block. The training sequences need not be related to the test sequences, in terms of their content, as the premise of the approach is that it detects objects of interest, but is not sensitive to the signatures of specific objects, and can therefore maintain its detection performance from one type of imagery to another.

Once an exemplary human imaging module has analyzed the relevant data, it can generate a list of images or image chips and their associated classification confidences, which can be used to prioritize the visualization of the corresponding images or image locations. The visualization interface permits the visualization of the prioritized locations in an adequate software environment for the task or user at hand. For example, for image analysts, certain embodiments use an interface to RemoteView, an imagery exploitation software application often used in the GeoIntelligence community. The interface provides a play control like toolbar that lets the analyst jump from one prioritized location to the next, while the analyst still retains access to all of RemoteView's functionality.

It is also possible and useful in connection with the disclosed subject matter to implement EEG-RSVP analysis systems and methods followed by computer vision (such as TAG) systems and methods as part of a combined system and method. In certain exemplary embodiments, in the absence of prior knowledge of the target type or a model of what an "interesting" image is, the EEG-RSVP is first run on samples of $D_i$, which can result in an image reordering in which images are ranked based on how they attracted the human subject's attention. This reordering can be used to generate labels for a computer vision based learning system which, given a partial labeling of $D_i$, propagates these labels and re-orders the database. In this embodiment, EEG scores are numbers with more positive scores indicating that the subject was interested in or strongly attending to the presented multimedia data. The scores are sorted and the multimedia data associated with the top N scores are considered positives and labeled as such (given label +1) and used as training data for the TAG system. N can be chosen to be fixed (e.g., top 20 scores) or can be selected based on the requirements of a certain precision (e.g., the N scores where at least X % are true positives and 100-X % are false positives). In another embodiment, the lowest M ranked EEG scores are considered negatives and labeled as such (label=−1) so that N positive examples and M negative examples are provided to the TAG system. In another embodiment, the real-number values of the EEG scores are used to weight the strength of the training examples. For instance a EEG score of 0.3 for a EEG labeled image would result in a training label that is three times stronger than an EEG labeled image with a score of 0.1. The EEG-RSVP is designed to identify a small number "interesting" images which are then used by a semi-supervised computer vision system to reorder the entire image database.

Exemplary systems in which computer vision analysis follows EEG analysis can be similar to the alternative computer vision followed by EEG systems, in that they can use the same type of components, such as a computer vision module, an EEG analysis module, and a visualization/review module. However, in these systems, the EEG analysis module precedes the computer vision TAG components. Additionally, the number of examples provided by the EEG analysis can be insufficient to train conventional supervised learning algorithms, and there can be inaccuracies in the EEG outputs due to typically lower sensitivity of the approach. Therefore, a computer vision TAG module underpinned by a semi-supervised learning algorithm can be used to improve the EEG output. In certain embodiments, the outputs of the EEG systems and methods are a set of positive and negative examples (as determined by a suitable EEG confidence threshold), that can serve as labeled inputs to a graph-based classifier to predict the labels of remaining unlabeled examples in a database. TAG can then incorporate its automated graph-based label propagation methods and in real or near-real time generate refined labels for all remaining unlabeled data in the collection.

Further, as previously mentioned, it is also possible to have tightly coupled EEG systems and computer vision systems and methods in accordance with the disclosed subject matter. In certain embodiments, both EEG analysis and computer visions are run in parallel and coupled either at the feature space level, or at the output (or confidence measure) level, leading to a single combined confidence measure that can serve as a priority indicator. This mode can require prior information on the target type. These modes can also potentially include feedback or multiple iterations within a closed-loop system.

Additionally, in certain embodiments of the disclosed subject matter, data is first analyzed using a EEG system and the results are used as the basis for input to a computer vision system such as TAG. The computer vision system can then be used to refine the data to be presented to a human once again as part of further EEG-based analysis. Among other things, a closed-loop implementation such as this can allow for more refined results and more efficient analysis of large sets of data.

Figure 7:
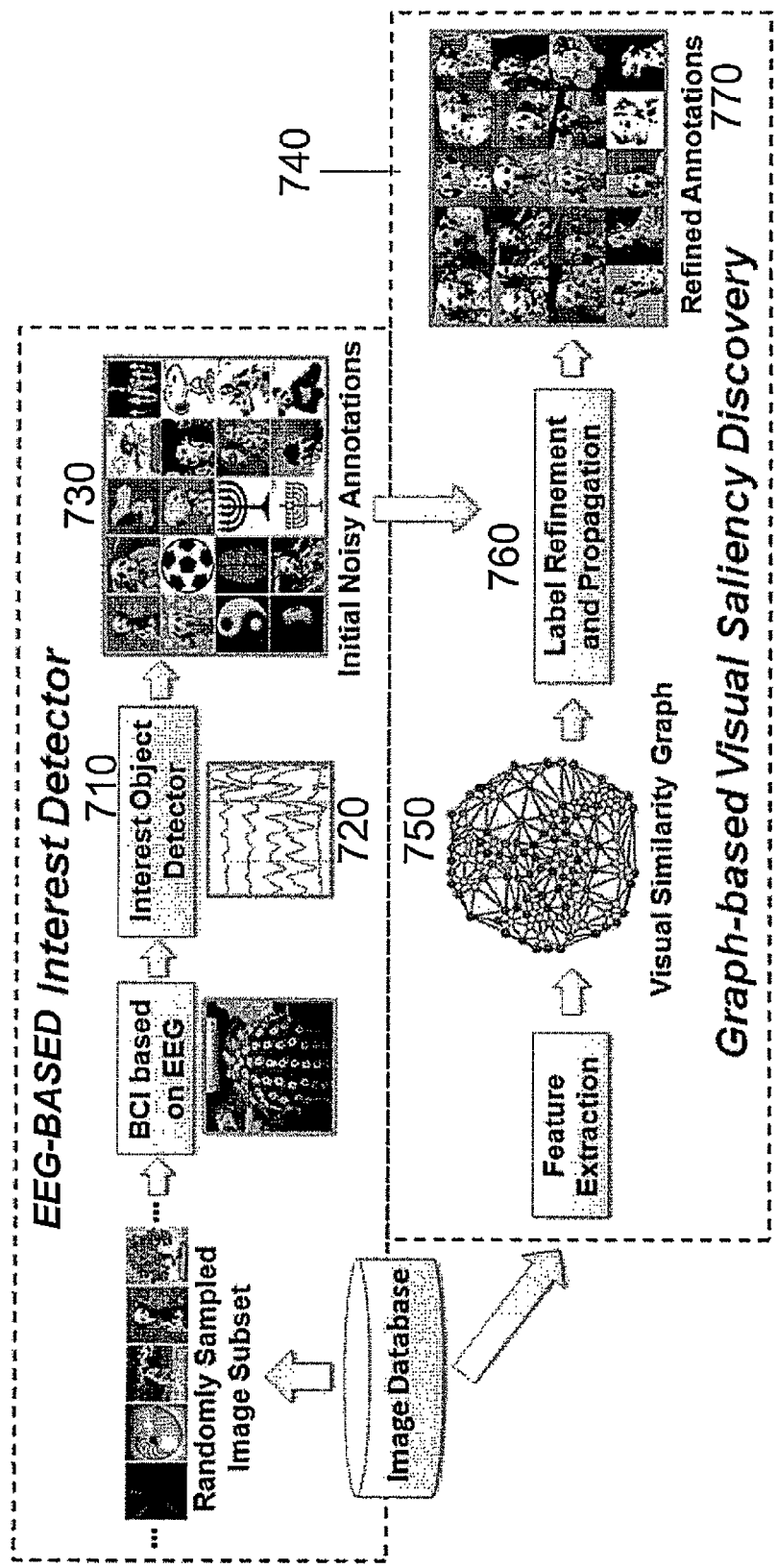
FIG. 7 is a diagram illustrating exemplary aspects of a combined brain-computer multimedia processing system in accordance with the presently disclosed subject matter.

FIG. 7 is a diagram illustrating exemplary aspects of a combined human-computer/multimedia-processing system in accordance with the presently disclosed subject matter. In this particular embodiment, EEG-based generic interest detector 710 includes an interest object detector 710 which performs calculations resulting in an initial label (annotation) set 730. This set can be used as an input to a computer vision system 740 including, among other things, a visual similarity graph 750 and a label refinement module 760 which can be used to generate a refined label/annotation set 770.

Figure 8:
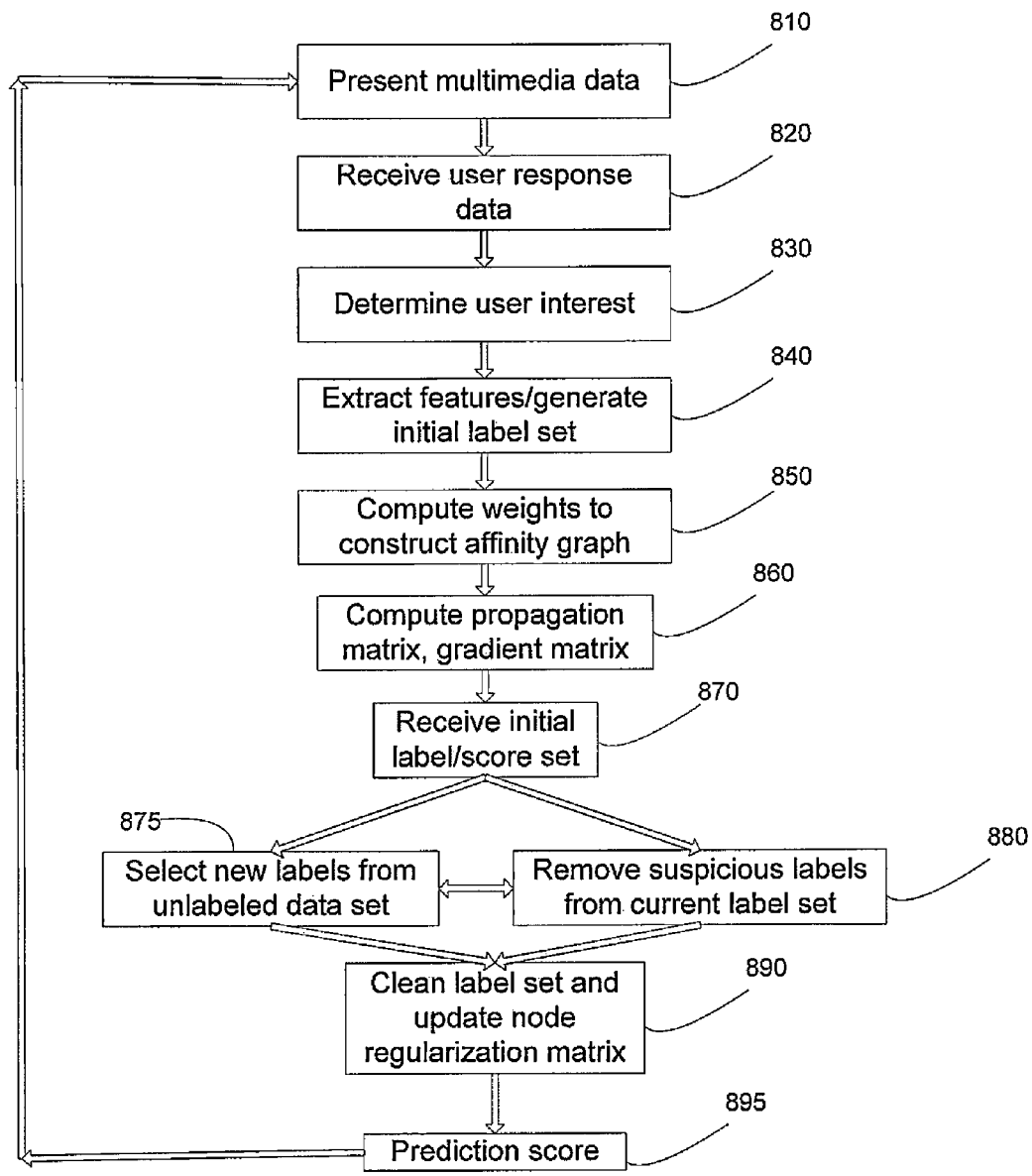
FIG. 8 is a flow chart illustrating an exemplary method according to the presently disclosed subject matter.

FIG. 8 is a flow chart illustrating a combined EEG-based interest detection method coupled to a TAG labeling propagation method in accordance with an exemplary implementation of the presently disclosed subject matter. At 810, a system presents multimedia data to a user. At 820, the system receives user response data based on the user's brain signal response to the presented data. At 830, the system determines user interest in the presented data based on the EEG response data. 820 and 830 involve using hardware such as the system of FIG. 6 to, more specifically, receive EEG signals and amplify, decode, and process them in real time as the human subject is viewing a rapid succession of images being presented on a display. At 840, the system can extract relevant features from image data and generates an initial label set. At 850, the similarity or association relations between data samples are computed or acquired to construct an affinity graph. At 860, some graph quantities, including a propagation matrix and gradient coefficient matrix, are computed based on the affinity graph. At 870, an initial label or score set over a subset of graph data is acquired from the system component which generated the initial label set based on user response data. 850 and 860 can be performed before or after 870. At 875, which is optional, one or more new labels are selected and added to the label set. 880 is optional, wherein one or more unreliable labels are selected and removed from the existing label set. At 890, cleaned label set are obtained and a node regularization matrix is updated to handle the unbalanced class size problem of label data set. Note that 875, 880 and 890 can be repeated, if necessary, until a certain number of iterations or some stop criteria are met. At 895, the final classification function and prediction scores over the data samples are computed. The output of 895 can be used to select and arrange certain presentations of images to users as input to 810 to complete a looped integration system.

The described methods and systems can be applied to recognize, propagate, and recommend other types of information relevant to a user's interest. This functionality may also be implemented in other applications besides multimedia data labeling and retrieval.

For instance, certain embodiments of the disclosed systems and methods can also be used for web search improvements. Images on web sharing sites often are already associated with textual tags, assigned by users who upload the images. However, it is well known to those skilled in the art that such manually assigned tags can often be erratic and inaccurate. Discrepancies can be due, for example, to the ambiguity and/or non-uniformity of labels or lack of control of the labeling process. Embodiments of the disclosed systems and methods can be used to efficiently refine the accuracy of the labels and improve the overall usefulness of search results from these types of internet websites, and more generally, to improve the usefulness and accuracy of internet multimedia searches overall.

In embodiments involving user's interaction with online media objects, such as video, music, and social network website postings, analysis of a user's neural signatures can be used to produce the initial measures of user interest with respect to the various online media objects. The interest measures can then be used as initial labels which are then propagated over a graph to other objects. In a manner similar to that described above, the nodes in the graph can represent the media objects and the edges in the graph capture relationships among media objects, such as the similarity of videos or music, similarity of authors and genres, and similarity of the comments made by online users on a social network or other similar website. After the label propagation progress, predicted labels of other nodes can be used to estimate the potential interest of the user with respect to other media objects, which are then recommended to the user based on the sorted rankings of the predicted interest scores.

Certain exemplary embodiments of the presently disclosed subject matter can utilize these neural signatures to tag information in the virtual world so as to optimize navigation through the virtual world. Such navigation functions include, for example and without limitation, implementations found in electronic games, virtual reality, and augmented reality systems. The virtual world can be represented via a graph with nodes being locations, objects, or events in the world and edges being relationships between those locations, objects, or events. Each node has features that represent attributes of the objects or events, and context at that specific location. Node connectedness and features can be based on coordinates in the virtual world or similarity of the attributes (e.g., similar visual appearances or similar event categories). Neural signatures, measured for example via EEG, can be used as labels that reflect the subjective perceptual/cognitive/emotional state of the user given their location or viewing of the objects or events. Such neural signatures could reflect subjective states such has "how interesting is this location/object", "how excited am I to be at this location or see this object/event", as well as brain states that can be decoded via EEG or other neural measures. The resulting labels (or neural scores) can then be propagated through the graph-based representation of the virtual world to identify other locations, objects, or events in the world that would likely yield a similar perceptual/cognitive/emotional state for the user. This information can then be used in a variety of ways, for example, to make recommendations or plan a path for the user to visit specific locations, objects or events in the virtual world. The virtual world can be one in which the subject is an avatar in an otherwise rich multisensory world, a mobile user exploring a physical environment, or a participant in a more abstract world such as a social network.

Figure 9:
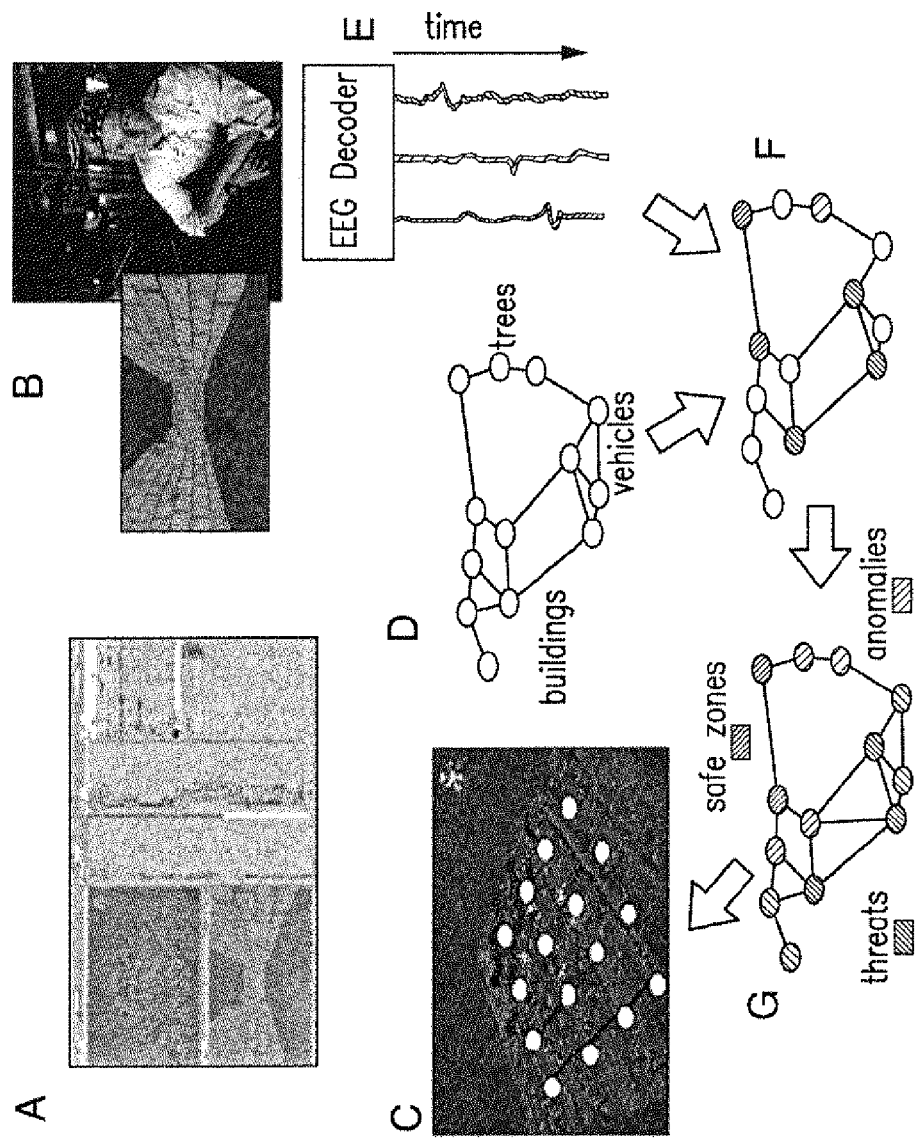
FIG. 9 is a diagram illustrating exemplary aspects of a virtual-world user-navigation system in accordance with the presently disclosed subject matter.

FIG. 9 is a diagram illustrating exemplary aspects of a system for user navigation in an example virtual world in accordance with the presently disclosed subject matter. FIG. 9A shows an exemplary system GUI that can optionally be implemented in accordance with the presently disclosed subject matter. The GUI includes a situation awareness (SA) map 910 indicating the importance of locations in the virtual world based on the prediction of the user interest and possibly other prior knowledge; and the interface 920 for the user (as an avatar) to visualize the locations, objects, and events in the world. FIG. 9B illustrates the user interface 920 and the user 930 wearing a neural signal sensing device 940. FIG. 9C shows a higher-resolution version of the SA map 910, which indicates the importance of locations included in the world.

FIG. 9D shows the graph representation of the virtual world. FIG. 9E shows the neural signals recorded by the device during the navigation process. FIG. 9F plots the initial measured interest scores on the graph based on the neural signal analysis. FIG. 9G shows the predicted labels after label propagation indicating the interest scores (importance) of all nodes.

Certain embodiments in connection with the disclosed subject matter can similarly be applied to use neural signatures for tagging information in the real world so as to optimize navigation and interaction with real world places and objects. Such navigation functions may include, without limitation, implementations found in mobile navigation systems. The real world can be represented via a graph with nodes being locations, objects, or events in the world and edges being relationships between those locations, objects, or events. Each node has features that represent attributes of the objects or events, and can include context at the specific location. Node connectedness and features can be based on geospatial position system (GPS) coordinates or similarity of the attributes (e.g., similar visual appearances or similar event categories). Neural signatures, measured for example via EEG, can be used as labels that reflect the subjective perceptual/cognitive/emotional state of the user given their location or viewing of the objects or events. As in the virtual world context above, such neural signatures could reflect subjective states such has "how interesting is this location/object", "how excited am Ito be at this location or see this object/event", as well as brain states that can be decoded via EEG or other neural measures. The resulting labels (aka, neural scores) can then be propagated through the graph-based representation of the real world to identify other locations, objects, or events in the world that would likely yield a similar perceptual/cognitive/emotional state for the user. This information can then used in a variety of ways, for example, to make recommendations or plan a path for the user to visit specific locations, objects or events in the real world.

In accordance with the presently disclosed subject matter, the term "multimedia" may broadly encompass all manner of sensory data processed by human physical sensory systems, including, without limitation, traditional multimedia objects viewed on a display, such as video and images, audio, text; virtual-space objects such as those encountered in electronic games, virtual reality, and augmented reality; and even physical-space real-world objects such as locations, objects, events, sights, sounds, tastes, smells, and tactile sensations. This listing of examples is not intended to be exhaustive. In accordance with the disclosed subject matter, a user's brain states can be decoded via EEG to ascertain reactions to all mariner of stimulus—from perception of on-screen displayed information to perception of experiences of places or objects in the real world—to achieve benefits in connection with the labeling, categorizing, searching and recommending applications disclosed in connection with the exemplary embodiments.

Because the disclosed systems and methods are scalable in terms of feature representation, other application specified features can also be utilized to improve the graph propagation.

In another embodiment, a system and method for collaborative search can be employed. In such an embodiment, multiple EEG scores can be received from multiple human observers simultaneously, with the human observers each being presented the same multimedia data. The multiple scores can be processed and used to construct labels for the displayed multimedia data.

Further, computer vision systems and methods for use with brain-computer interfaces and methods as described herein are not limited to TAG or LDST systems and methods. Other back-end systems that may be used to process the brain-computer interface data may include any type of statistical model, including clustering, support vector machines, belief networks, and kernel-based systems and methods. Any computer vision label propagation component may be utilized. Ultimately, the described brain-computer interface can be used in conjunction with a number of different computer analysis systems to achieve the principles of the disclosed subject matter.

The foregoing merely illustrates the principles of the disclosed subject matter. Various modifications and alterations to the described embodiments will be apparent to those skilled in the art in view of the teachings herein. Further, it should be noted that the language used in the specification has been principally selected for readability and instructional purposes, and can not have been selected to delineate or circumscribe the inventive subject matter. Accordingly, the disclosure herein is intended to be illustrative, but not limiting, of the scope of the disclosed subject matter, which is set forth in the following claims.

The invention claimed is:

1. A computer-based method for labeling multimedia objects comprising:
   presenting selected multimedia data to a first user;
   determining user interest in said selected multimedia data based upon brain signal responses of the first user;
   generating selected multimedia label data corresponding to the selected multimedia data based on the determination of user interest;
   using a processor and based on at least said generated selected multimedia label data, performing at least one of refining multimedia label data associated with said selected multimedia data or predicting new multimedia label data pertaining to said stored multimedia data by calculating a classification function.

2. The method of claim 1, further comprising
   storing a multimedia affinity graph in one or more memories, wherein said affinity graph represents multimedia data samples as nodes and comprises edges measuring relatedness among data samples; and
   calculating a classification function based on at least the selected multimedia label data using a processor associated with said one or more memories, wherein calculating said classification function comprises iteratively performing at least updating selected multimedia label data relating to selected multimedia data or predicting new multimedia label data for stored multimedia data using said processor.

3. The method of claim 2, wherein at least one multimedia label data sample is further normalized based on a regularization matrix calculated using members of a corresponding class and connectivity degrees of the corresponding nodes in the graph.

4. The method of claim 3, wherein replacing unreliable label data comprises adding a multimedia label data sample for every multimedia label data sample that is removed.

5. The method of claim 2, wherein calculating a classification function comprises incremental calculation using graph superposition, wherein a newly added label is incorporated incrementally without calculating a classification function using all labels.

6. The method of claim 2 wherein unreliable label data is replaced.

7. The method of claim 6, wherein replacing unreliable label data comprises adding a multimedia label data sample for every multimedia label.

8. The method of claim 6, wherein replacing unreliable label data or predicting new multimedia label data comprise updating a node regularization matrix.

9. The method of claim 6, wherein replacing unreliable label data or predicting new multimedia label data comprises minimizing an objective function.

10. The method of claim 2 wherein unreliable label data is replaced.

11. The system of claim 10, wherein replacing unreliable label data comprises adding a multimedia label data sample for every multimedia label.

12. The system of claim 10, wherein replacing unreliable label data or predicting new multimedia label data comprise updating a node regularization matrix.

13. The system of claim 10, wherein replacing unreliable label data or predicting new multimedia label data comprises minimizing an objective function.

14. The method of claim 1, wherein generating selected multimedia label data comprises decoding the brain signal responses of the user and generating at least one interest score for said selected multimedia data.

15. The method of claim 14, further comprising refining said interest score and generating an updated interest measurement.

16. The method of claim 14, further comprising converting said at least one interest score to at least one interest label.

17. The method of claim 16, wherein converting said at least one interest score to at least one interest label comprises using a binarization function.

18. The method of claim 1, wherein the multimedia data comprises image data.

19. The method of claim 1, wherein the multimedia data comprises video data.

20. The method of claim 1, wherein the multimedia data comprises audio data.

21. The method of claim 1, wherein the multimedia data comprises locations, objects, and events in a virtual world.

22. The method of claim 1, wherein the multimedia data comprises locations, objects, and events in a physical world.

23. The method of claim 1, wherein predicting new multimedia label data comprises automatically selecting a most informative data sample, predicting its corresponding class and labeling the corresponding data sample.

24. The method of claim 1, wherein refining at least a portion of said multimedia label data comprises performing a greedy search among the gradient direction of the classification function.

25. The method of claim 1 wherein unreliable label data is replaced.

26. The method of claim 25, wherein replacing unreliable label data comprises adding a multimedia label data sample for every multimedia label data sample that is removed.

27. The method of claim 25, wherein replacing unreliable label data comprises adding a multimedia label data sample for every multimedia label data sample that is removed.

28. The method of claim 1, comprising presenting said selected multimedia data to said first user one or more additional times and determining user interest in said selected multimedia data one or more additional times to further refine said multimedia label data.

29. The method of claim 1, further comprising:
presenting said selected multimedia data to a second user,
determining user interest in said selected multimedia data based on at least brain signal responses of the first user and brain signal responses of the second user.

30. The method of claim 1, further comprising using said refined or predicted multimedia label data to perform a search of said stored multimedia data.

31. A system for labeling multimedia data comprising:
one or more memories;
one or more processors coupled to said one or more memories, wherein said one or more processors are configured to:
present selected multimedia data to a first user;
determine user interest in said selected multimedia data based upon brain signal responses of the first user;
generate selected multimedia label data corresponding to the selected multimedia data based on the determination of user interest;
based on at least said generated selected multimedia label data, perform at least one of refining multimedia label data associated with said selected multimedia data or predicting new multimedia label data pertaining to said stored multimedia data by calculating a classification function.

32. The system of claim 31, wherein said one or more processors are further configured to:
store a multimedia affinity graph in said one or more memories, wherein said affinity graph represents multimedia data samples as nodes and comprises edges measuring relatedness among data samples; and
calculate a classification function based on at least the selected multimedia label data, wherein calculating said classification function comprises iteratively performing at least updating selected multimedia label data relating to selected multimedia data or predicting new multimedia label data for stored multimedia data.

33. The system of claim 32, wherein said one or more processors are further configured to normalize at least one multimedia label data sample on a regularization matrix calculated using members of a corresponding class and connectivity degrees of the corresponding nodes in the graph.

34. The system of claim 32, wherein calculating a classification function comprises incremental calculation using graph superposition, wherein a newly added label is incorporated incrementally without calculating a classification function using all labels.

35. The system of claim 31, wherein generating selected multimedia label data comprises decoding the brain signal responses of the user and generating at least one interest score for said selected multimedia data.

36. The system of claim 35, wherein said one or more processors are further configured to refine said interest score and generate an updated interest measurement.

37. The system of claim 35, wherein said one or more processors are further configured to convert said at least one interest score to at least one interest label.

38. The system of claim 37, wherein converting said at least one interest score to at least one interest label comprises using a binarization function.

39. The system of claim 31, wherein the multimedia data comprises image data.

40. The system of claim 31, wherein the multimedia data comprises video data.

41. The system of claim 31, wherein the multimedia data comprises audio data.

42. The method of claim 31, wherein the multimedia data comprises locations, objects, and events in a virtual world.

43. The method of claim 31, wherein the multimedia data comprises locations, objects, and events in a physical world.

44. The system of claim 31, wherein predicting new multimedia label data comprises automatically selecting a most informative data sample, predicting its corresponding class and labeling the corresponding data sample.

45. The system of claim 31, wherein refining at least a portion of said multimedia label data comprises performing a greedy search among the gradient direction of the classification function.

46. The system of claim 31 wherein unreliable label data is replaced.

47. The system of claim 31, wherein said one or more processors are further configured to present said selected multimedia data to said first user one or more additional times and determine user interest in said selected multimedia data one or more additional times to further refine said multimedia label data.

48. The system of claim 31, wherein said one or more processors are further configured to:
present said selected multimedia data to a second user,
determine user interest in said selected multimedia data based on at least brain signal responses of the first user and brain signal responses of the second user.

49. The system of claim 31, wherein said one or more processors are further configured to use said refined or predicted multimedia label data to perform a search of said stored multimedia data.

50. A computer readable medium containing digital information which when executed cause a processor or processors to:
present selected multimedia data to a first user;
determine user interest in said selected multimedia data based upon brain signal responses of the first user;
generate selected multimedia label data corresponding to the selected multimedia data based on the determination of user interest;
based on at least said generated selected multimedia label data, perform at least one of refining multimedia label data associated with said selected multimedia data or predicting new multimedia label data pertaining to said stored multimedia data by calculating a classification function.

51. The computer readable medium of claim 50 containing digital information which when executed further causes the processor or processors to:
store a multimedia affinity graph in one or more memories, wherein said affinity graph represents multimedia data samples as nodes and comprises edges measuring relatedness among data samples; and
calculate a classification function based on at least the selected multimedia label data, wherein calculating said classification function comprises iteratively performing at least updating selected multimedia label data relating to selected multimedia data or predicting new multimedia label data for stored multimedia data.

52. The computer readable medium of claim 51, wherein at least one multimedia label data sample is further normalized based on a regularization matrix calculated using members of a corresponding class and connectivity degrees of the corresponding nodes in the graph.

53. The computer readable medium of claim 51, wherein calculating a classification function comprises incremental calculation using graph superposition, wherein a newly added label is incorporated incrementally without calculating a classification function using all labels.

54. The computer readable medium of claim 51 wherein unreliable label data is replaced.

55. The computer readable medium of claim 54, wherein replacing unreliable label data comprises adding a multimedia label data sample for every multimedia label.

56. The computer readable medium of claim 54, wherein replacing unreliable label data or predicting new multimedia label data comprise updating a node regularization matrix.

57. The computer readable medium of claim 54, wherein replacing unreliable label data or predicting new multimedia label data comprises minimizing an objective function.

58. The computer readable medium of claim 50, wherein generating selected multimedia label data comprises decoding the brain signal responses of the user and generating at least one interest score for said selected multimedia data.

59. The computer readable medium of claim 58 containing digital information which when executed further causes the processor or processors to refine said interest score and generate an updated interest measurement.

60. The computer readable medium of claim 58 containing digital information which when executed further causes the processor or processors to convert said at least one interest score to at least one interest label.

61. The computer readable medium of claim 60, wherein converting said at least one interest score to at least one interest label comprises using a binarization function.

62. The computer readable medium of claim 50, wherein the multimedia data comprises image data.

63. The computer readable medium of claim 50, wherein the multimedia data comprises video data.

64. The computer readable medium of claim 50, wherein the multimedia data comprises audio data.

65. The method of claim 50, wherein the multimedia data comprises locations, objects, and events in a physical or virtual world.

66. The method of claim 50, wherein the multimedia data comprises locations, objects, and events in a physical world.

67. The computer readable medium of claim 50, wherein predicting new multimedia label data comprises automatically selecting a most informative data sample, predicting its corresponding class and labeling the corresponding data sample.

68. The computer readable medium of claim 50, wherein refining at least a portion of said multimedia label data comprises performing a greedy search among the gradient direction of the classification function.

69. The computer readable medium of claim 50 wherein unreliable label data is replaced.

70. The computer readable medium of claim 50 containing digital information which when executed further causes the processor or processors to present said selected multimedia data to said first user one or more additional times and determine user interest in said selected multimedia data one or more additional times to further refine said multimedia label data.

71. The computer readable medium of claim 50 containing digital information which when executed further causes the processor or processors to:
  present said selected multimedia data to a second user,
  determine user interest in said selected multimedia data based on at least brain signal responses of the first user and brain signal responses of the second user.

72. The computer readable medium of claim 50 containing digital information which when executed further causes the processor or processors to use said refined or predicted multimedia label data to perform a search of said stored multimedia data.

* * * * *